(12) United States Patent
Takebe et al.

(10) Patent No.: US 8,131,087 B2
(45) Date of Patent: Mar. 6, 2012

(54) PROGRAM AND APPARATUS FOR FORMS PROCESSING

(75) Inventors: Hiroaki Takebe, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 910 days.

(21) Appl. No.: 12/216,632

(22) Filed: Jul. 8, 2008

(65) Prior Publication Data

US 2008/0273802 A1 Nov. 6, 2008

Related U.S. Application Data

(63) Continuation of application No. PCT/JP2006/300325, filed on Jan. 13, 2006.

(51) Int. Cl.
*G06K 9/72* (2006.01)
*G06K 9/00* (2006.01)
*G06K 9/18* (2006.01)
*G06K 9/60* (2006.01)

(52) U.S. Cl. ........ 382/229; 382/101; 382/137; 382/181; 382/185; 382/186; 382/187; 382/305

(58) Field of Classification Search .................. 382/101, 382/137, 181, 185–187, 305
See application file for complete search history.

(56) References Cited

U.S. PATENT DOCUMENTS

| | | | |
|---|---|---|---|
| 6,104,500 A * | 8/2000 | Alam et al. | 358/1.15 |
| 6,614,931 B1 * | 9/2003 | Nalder | 382/187 |
| 6,625,313 B1 | 9/2003 | Morita et al. | |
| 6,721,451 B1 * | 4/2004 | Ishitani | 382/181 |
| 2004/0008889 A1 * | 1/2004 | Ikeda | 382/182 |

FOREIGN PATENT DOCUMENTS

| | | |
|---|---|---|
| CN | 1265499 A | 9/2000 |
| JP | 10-078997 | 3/1998 |
| JP | 2001-312691 | 11/2001 |
| JP | 2001312691 A * | 11/2001 |

OTHER PUBLICATIONS

Ishitani, "Model-based information extraction and its applications for document images," DLIA 2001.*
Tuganbaev et al., "Universal data capture technology from semi-structured forms," ICDAR Aug. 29-Sep. 1, 2005.*
Japanese Office Action in Appln. No. 2007-553802, dated Feb. 8, 2011.
Patent Abstracts of Japan, Publication No. 2001-312691, Published Nov. 9, 2001.

(Continued)

*Primary Examiner* — Vu Le
*Assistant Examiner* — Soo Park
(74) *Attorney, Agent, or Firm* — Staas & Halsey LLP

(57) ABSTRACT

A form processing program which is capable of automatically extracting keywords. When the image of a scanned form is entered, a layout recognizer extracts a readout region of the form image, a character recognizer recognizes characters within the readout region. A form logical definition database stores form logical definitions defining strings as keywords according to logical structures which are common to forms of same type. A possible string extractor extracts as possible strings combinations of recognized characters each of which satisfies defined relationships of a string. A linking unit links the possible strings according to positional relationships, and determines a combination of possible strings as keywords.

15 Claims, 20 Drawing Sheets

OTHER PUBLICATIONS

Patent Abstracts of Japan, Publication No. 10-078997, Published Mar. 24, 1998.
Patent Abstracts of Japan No. 11-238165 published Aug. 31, 1999.
Patent Abstracts of Japan No. 2001-312691 published Nov. 9, 2001.
Patent Abstracts of Japan No. 10-302023 published Nov. 13, 1998.
Patent Abstracts of Japan No. 10-078997 published Mar. 24, 1998.
Patent Abstracts of Japan No. 5-089279 published Apr. 9, 1993.
Chinese Patent Office Action issued May 14, 2010 in Korean Patent Application No. 200680050931.6.
Patent Abstracts of Japan, Publication No. 2001312691A, Published Nov. 9, 2001.
Chinese Patent Office Action issued May 14, 2010 in Chinese Patent Application No. 200680050931.6.

* cited by examiner

| | 210 | 220 |
|---|---|---|
| CATEGORY | DATE | FORM NUMBER |
| ITEM STRINGS | DATE, ISSUE DATE | YOUR RECEPTION, ORDER NUMBER |
| CHARACTERS TO BE USED FOR DATA | NUMERALS | NUMERALS |
| NORMAL EXPRESSIONS TO BE USED FOR DATA | */*/*, (month) *,* | ***** |
| RELATIVE POSITION OF DATA WITH RESPECT TO ITEM | RIGHT, BELOW | RIGHT, BELOW |
| CHARACTERS THAT MAY EXIST BETWEEN ITEM AND DATA | : | : |

CLIQUES

350 INTEGRITY GRAPH TABLE

|    | 1 | 2 | 3 | 4 | 5 | 6 | 7 | 8 | 9 | 10 | 11 | 12 | 13 | 14 | 15 | 16 | 17 | 18 | 19 |
|----|---|---|---|---|---|---|---|---|---|----|----|----|----|----|----|----|----|----|----|
| 1  | – | 1 | 1 | 1 | 1 | 1 | 1 | 1 | 1 | 1  | 1  | 1  | 1  | 1  | 1  | 0  | 0  | 0  | 0  |
| 2  | 1 | – | 1 | 1 | 1 | 1 | 1 | 1 | 1 | 1  | 1  | 1  | 1  | 1  | 1  | 0  | 0  | 0  | 0  |
| 3  | 1 | 1 | – | 1 | 1 | 1 | 1 | 1 | 1 | 1  | 1  | 1  | 1  | 1  | 1  | 0  | 0  | 0  | 0  |
| 4  | 1 | 1 | 1 | – | 1 | 1 | 1 | 1 | 1 | 1  | 1  | 1  | 1  | 1  | 1  | 0  | 0  | 0  | 0  |
| 5  | 1 | 1 | 1 | 1 | – | 1 | 1 | 1 | 1 | 1  | 1  | 1  | 1  | 1  | 1  | 0  | 0  | 0  | 0  |
| 6  | 1 | 1 | 1 | 1 | 1 | – | 1 | 1 | 1 | 1  | 1  | 1  | 1  | 1  | 1  | 0  | 0  | 0  | 0  |
| 7  | 1 | 1 | 1 | 1 | 1 | 1 | – | 1 | 1 | 1  | 1  | 1  | 1  | 1  | 1  | 0  | 0  | 0  | 0  |
| 8  | 1 | 1 | 1 | 1 | 1 | 1 | 1 | – | 1 | 1  | 1  | 1  | 1  | 1  | 1  | 0  | 0  | 0  | 0  |
| 9  | 1 | 1 | 1 | 1 | 1 | 1 | 1 | 1 | – | 1  | 1  | 1  | 1  | 1  | 1  | 0  | 0  | 0  | 0  |
| 10 | 1 | 1 | 1 | 1 | 1 | 1 | 1 | 1 | 1 | –  | 1  | 1  | 1  | 1  | 1  | 0  | 0  | 0  | 0  |
| 11 | 1 | 1 | 1 | 1 | 1 | 1 | 1 | 1 | 1 | 1  | –  | 1  | 1  | 1  | 1  | 0  | 0  | 0  | 0  |
| 12 | 1 | 1 | 1 | 1 | 1 | 1 | 1 | 1 | 1 | 1  | 1  | –  | 1  | 1  | 1  | 0  | 0  | 0  | 0  |
| 13 | 1 | 1 | 1 | 1 | 1 | 1 | 1 | 1 | 1 | 1  | 1  | 1  | –  | 1  | 1  | 0  | 0  | 0  | 0  |
| 14 | 1 | 1 | 1 | 1 | 1 | 1 | 1 | 1 | 1 | 1  | 1  | 1  | 1  | –  | 1  | 0  | 0  | 0  | 0  |
| 15 | 1 | 1 | 1 | 1 | 1 | 1 | 1 | 1 | 1 | 1  | 1  | 1  | 1  | 1  | –  | 0  | 0  | 0  | 0  |
| 16 | 0 | 0 | 0 | 0 | 0 | 0 | 0 | 0 | 0 | 0  | 0  | 0  | 0  | 0  | 0  | –  | 1  | 1  | 0  |
| 17 | 0 | 0 | 0 | 0 | 0 | 0 | 0 | 0 | 0 | 0  | 0  | 0  | 0  | 0  | 0  | 1  | –  | 0  | 0  |
| 18 | 0 | 0 | 0 | 0 | 0 | 0 | 0 | 0 | 0 | 0  | 0  | 0  | 0  | 0  | 0  | 1  | 0  | –  | 0  |
| 19 | 0 | 0 | 0 | 0 | 0 | 0 | 0 | 0 | 0 | 0  | 0  | 0  | 0  | 0  | 0  | 0  | 0  | 0  | –  |

FIG. 9

910 FORM IMAGE

| PRODUCT NAME | | PRICE | 911 912 |
|---|---|---|---|
| AKL300 | | ¥40,000 | |
| BKL500 | | ¥42,000 | 913 |
| | TOTAL 915 | ¥82,000 | 914 |

FIG. 20A

920 FORM IMAGE

| | ISSUE DATE 921 | DECEMBER 2, 2005 922 |
|---|---|---|
| ESTIMATE EXPIRY DATE 923 | DECEMBER 16, 2005 924 | |

FIG. 20B

PROGRAM AND APPARATUS FOR FORMS PROCESSING

This application is continuing application, filed under 35 U.S.C. §111(a), of International Application PCT/JP2006/300325, filed Jan. 13, 2006.

BACKGROUND OF THE INVENTION (1) Field of the Invention

The present invention relates to a program and apparatus for forms processing, and more particularly to a program and apparatus for forms processing, which extract prescribed keywords from a scanned form image.

(2) Description of the Related Art

In related art, there are two approaches for form input operation which converts paper documents into electronic form: one is structured-form input and the other is non-structured-form input.

The structured-form input operation is employed when the types of forms to be entered are known. The layouts of forms to be entered, such as the positions of keywords and so on, are previously defined. The form of a scanned form image is identified, and keywords are automatically extracted based on the defined layout corresponding to the form. However, this structured-form input operation has a drawback that this method cannot be employed for a case where forms are of unknown types. For processing forms of unknown types, layout definitions should be manually made in advance for each form to be processed, which costs a lot.

On the other hand, the non-structured-form input operation is employed when the types of forms to be entered is unknown. In this method, as the layout definitions cannot be made, the input operation should be manually done. Therefore, a manual input cost is very high.

As described above, both of the structured-form input and non-structured-form input operations have drawbacks. In order to streamline the form input operation, a technique of automatically extracting keywords from non-structured forms is demanded.

There is a proposed form processing apparatus which identifies the image of a form, searches for and extracts a readout region based on preset keywords, and recognizes and obtains data within the region (for example, refer to Japanese Patent Laid-open Publication No. 11-238165, paragraphs [0009] to [0012] and FIG. 3).

In addition, to enhance the accuracy in keyword extraction, there is a proposed image processing method which extracts a tentative cell region according to a format such as ruled lines from a document image, recognizes characters within the cell of the image, searches for strings corresponding to specified keywords from the recognition result, and specifies a cell region from the detected strings (for example, refer to Japanese Patent Laid-open Publication No. 2001-312691, paragraphs [0013] to [0018], and FIG. 2).

In related art, in order to automatically extract keywords from non-structured forms, a readout region of a form image is determined through layout recognition, strings are recognized within the determined readout region through character recognition, and strings corresponding to keywords are detected from the recognized strings through word matching. However, it is not easy to perform the layout recognition and the character recognition on non-structured form images which do not have layout definitions, and there is always a possibility of failure. Further, the forms processing in related art performs matching on strings extracted through the layout recognition and the character recognition, which causes a problem that keywords cannot be extracted if the recognition processes are not done accurately.

One example will be described. FIGS. 19A and 19B are views showing a case where keywords cannot be accurately extracted due to failure in layout recognition. FIG. 19A is the image of a form and FIG. 19B shows text blocks recognized by performing the layout recognition on the form image of FIG. 19A.

In this example of these figures, a form image 901 produced by a scanner has a noise 902 due to dirt or the like of the form. When the layout recognition is performed on this form image 901, the "ESTIMATE (PRICE)" and "ESTIMATE (PRODUCT)" are recognized as falling into one block due to the noise 902 therebetween, with the result that a text block 903 including the noise is erroneously extracted. Therefore, "ESTIMATE" and "PRICE", and "ESTIMATE" and "PRODUCT" are separated. If the character recognition is performed on these recognized text blocks, a text block "ESTIMATE . . . ESTIMATE" 903, a text block "PRICE" 904, a text block "PRODUCT" 905, a text block "¥120,000" 906, and a text block "PERSONAL COMPUTER" 907 are recognized as strings. Therefore, even if keywords for the matching search include "ESTIMATE PRICE" and "ESTIMATE PRODUCT", these strings cannot be detected from the character recognition result, and thus keywords cannot be extracted.

As described above, under the situation where the layout recognition is failed, even if characters are correctly recognized, the arrangement of the characters is not correctly recognized, and thus keywords cannot be extracted. This is a problem. In addition, the same problem occurs when the layout recognition is correctly done but the character recognition is failed.

In addition, a keyword is represented by two types of elements: one is an item and the other is data. The forms processing of related art has another drawback that appropriate linking between items and data cannot be performed.

FIGS. 20A and 20B are views showing a case where it is difficult to link an item and data. FIG. 20A shows a case where two items can be linked to one piece of data. FIG. 20B shows a case where two pieces of data can be linked to one item.

Referring to FIG. 20A, the layout recognition process and the character recognition process are performed on a form image 910, and items, "price" 911 and "TOTAL" 915, and data, "¥40,000" 912, "¥42,000" 913, and "¥82,000" 914, are obtained. Based on the positional relationships of their text blocks, an item and data which have an almost same vertical or horizontal coordinate, that is, an item and data which can be regarded as being arranged in the vertical direction or horizontal direction are linked to each other. In this example of this figure, "¥40,000" 912 and "¥42,000" 913 are linked to the "PRICE" 911 which is arranged with them in the vertical direction. However, "¥82,000" 914 can be linked to both "price" 911 which is arranged with it in the vertical direction and "TOTAL" 915" which is arranged with it in the horizontal direction. It cannot be determined from the positional relationships which should be linked to "¥82,000" 914.

On the other hand, referring to FIG. 20B, by performing the layout recognition process and the character recognition process on a form image 920, items, "ISSUE DATE" 921 and "ESTIMATE EXPIRY DATE" 923, and data, "DECEMBER 2, 2005" 922 and "DECEMBER 16, 2005" 924, are obtained. Based on the positional relationships between them, the "ESTIMATE EXPIRY DATE" 923" and "DECEMBER 16, 2005" 924 can be linked to each other. However, "ISSUE DATE" 921 can be linked to both "DECEMBER 2, 2005" 922 which is arranged with it in the horizontal direction and "DECEMBER 16, 2005" which is arranged with it in the vertical direction. It cannot be determined from the positional relationships which should be linked to "issue date" 921. Similarly, "DECEMBER 16, 2005" 924 can be linked to both "ISSUE DATE" 921 and "ESTIMATE EXPIRY DATE" 923.

As described above, there are cases where it is difficult to correctly link extracted keyword items and extracted keyword data. However, there is no method for selecting an appropriate link in related art.

SUMMARY OF THE INVENTION

The present invention has been made in view of foregoing and intends to provide a computer-readable recording medium storing a form processing program and a form processing apparatus, which are capable of realizing stable keyword extraction, irrespective of defects in a recognition result and noise. In addition, this invention intends to provide the computer-readable recording medium storing the form processing program and the form processing apparatus, which are capable of performing linking between an item and data as keywords with taking entire integrity into consideration.

To accomplish the above objects, there is provided a computer-readable recording medium containing a form processing program for extracting prescribed keywords from a form image scanned. The form processing program causes a computer to perform as: a layout recognizer which recognizes a layout of the form image and extracts a readout region containing character images from the form image; a character recognizer which recognizes characters from the character images of the extracted readout region through character recognition, and outputs the recognized characters as a character recognition result; a possible string extractor which extracts from the character recognition result characters which are included in strings defined as the keywords in form logical definitions, and determines as possible strings combinations of extracted characters each of which satisfies positional relationships of one of the strings, the form logical definitions defining the strings as the keywords according to logical structures which are common to forms of same type; and a linking unit which, for the keywords each represented by a plurality of elements, links the possible strings belonging to different elements of the plurality of elements according to positional relationships on the form image, and determines a combination of possible strings as the keywords.

Further, to accomplish the objects, there is provided a form processing apparatus which has the above processing units for extracting prescribed keywords from a form image scanned. The form processing apparatus comprises: a layout recognizer which recognizes a layout of the form image and extracts a readout region containing character images from the form image; a character recognizer which recognizes characters from the character images of the extracted readout region through character recognition, and outputs the recognized characters as a character recognition result; a form logical definition memory storing form logical definitions defining the strings as the keywords according to logical structures which are common to forms of same type; a possible string extractor which reads out the form logical definitions regarding a form to be processed, extracts from the character recognition result characters which are included in the strings defined as the keywords in the form logical definitions, and determines as possible strings combinations of extracted characters each of which satisfies positional relationships of one of the strings; and a linking unit which, for the keywords each represented by a plurality of elements, links the possible strings belonging to different elements of the plurality of elements according to positional relationships on the form image, and determines a combination of possible strings as the keywords.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows an example of logical definitions according to the embodiment.

FIG. 9 shows an example of an integrity graph table in the form processing apparatus according to the embodiment.

FIG. 19A is the image of a form, and FIG. 19B shows text blocks recognized by performing layout recognition on the form image of FIG. 19A.

FIGS. 20A and 20B are views showing a case where it is difficult to link an item and data: FIG. 20A shows a case where two items can be linked to one piece of data, and FIG. 20B shows a case where two piece of data can be linked to one item.

DESCRIPTION OF THE PREFERRED EMBODIMENTS

A preferred embodiment of this invention will be described with reference to the accompanying drawings. The concept of the invention which is implemented in the embodiment will be first described and then the specific embodiment will be described.

Figure 1:
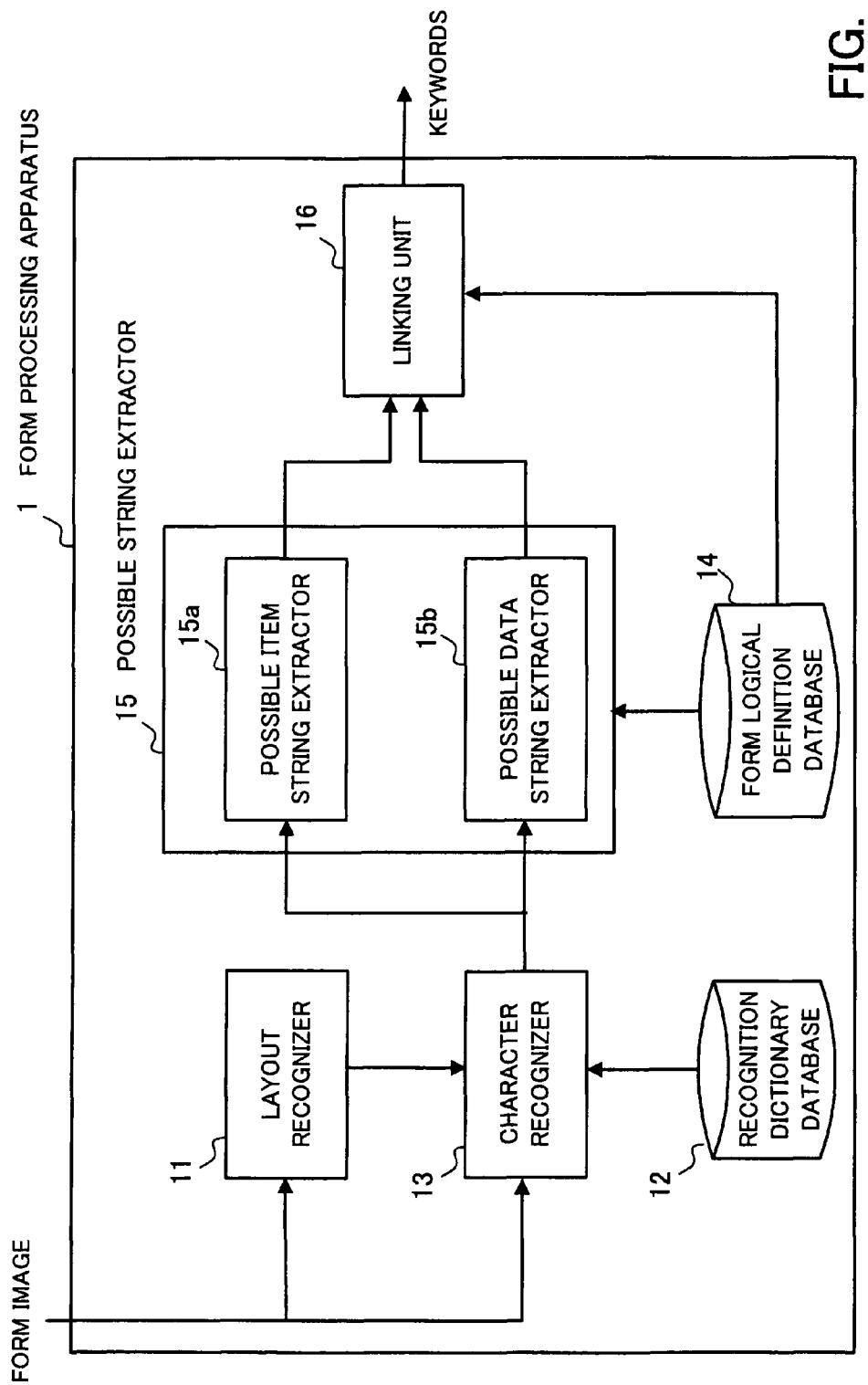
FIG. 1 shows a conceptual diagram of the invention which is implemented in one embodiment.

FIG. 1 is a conceptual view of the invention which is implemented in one embodiment.

A form processing apparatus 1 according to this invention has processing units including a layout recognizer 11 for extracting a readout region, a character recognizer 13 for performing a character recognition process on the readout region, a possible string extractor 15 for extracting possible strings, and a linking unit 16 for linking possible strings, and memory units for a recognition dictionary database 12 and a form logical definition database 14. In this connection, these processing units of the form processing apparatus 1 are realized by a computer executing a form processing program.

The layout recognizer 11 recognizes the layout of an entered form image, extracts a readout region containing character images, and gives a notice of the readout region to the character recognizer 13. There are various kinds of techniques for the layout recognition, and it is assumed that one of the techniques is employed here.

The recognition dictionary database 12 stores a recognition dictionary to be used to recognize characters of the character images.

The character recognizer 13 consults the recognition dictionary database 12 to recognize characters from the character images of the extracted readout region through the character recognition process, and outputs the recognized characters to the possible string extractor 15 as a character recognition result. Normally, all character types can be recognized through the character recognition process. However, the character recognition process may search for only strings and character types which are defined in form logical definitions of the form logical definition database 14. Limiting the character types to be searched for can enhance the accuracy in the character recognition process.

The form logical definition database 14 stores the form logical definitions which define strings as keywords according to logical structures which are common to forms of same type. The logical structures of forms comprise meanings, items, data, and relationships among them. As the form logical definitions, definitions relating to an item and data which are two elements to represent a keyword are made for each category. The item expresses the meaning of a keyword, and item strings which are considered to be written in forms are defined. The data is an actual value corresponding to the meaning of a keyword, and data region attributes including normal expressions and character types which are considered to be used in forms are defined.

The possible string extractor 15 extracts as possible strings combinations of recognized characters each of which satisfies relationships of a string, the relationships defined in the form logical definitions stored in the form logical definition database 14. More specifically, with the item strings defined in the form logical definitions as keys, the possible item string extractor 15a extracts characters which are included in the defined item strings, from the character recognition result. Then, the possible item string extractor 15a casts the extracted characters for the corresponding characters of the item strings, evaluates integrity between the cast characters in terms of their positional relationships, and then determines combinations of characters each of which satisfies the positional relationships of a string. In this connection, a graph theory is used for the integrity evaluation. For example, with cast characters as nodes, positional integrity is evaluated for two characters corresponding to each pair of nodes. When the positional integrity is verified between the two characters, the corresponding nodes are connected with a path, so as to create a graph. Then, cliques, which are partial complete graphs of a graph, are extracted from the graph. Every node forming a clique is connected to all nodes other than the own node with a path in the clique, and therefore it can be said that the nodes forming the clique entirely satisfy integrity. An evaluation value of each clique is calculated and the best clique is obtained. Then, a degree of matching of an item string is determined. Then, the item string with the highest degree of matching is output as a possible item string. In addition, the possible data string extractor 15b extracts a possible data string from the character recognition result based on the data region attributes defined in the form logical definitions. First, portions which can be value portions of the normal expressions of the data defined in the data region attributes are extracted from the character recognition result and collected as a value portion. Then, the possible data string extractor 15b processes the value portion and the strings included in the normal expressions, in the same way as the possible item string extractor 15a, so as to determine a possible data string.

The linking unit 16 links the possible item strings determined by the possible item string extractor 15a and the possible data strings determined by the possible data string extractor 15b according to the positional relationships defined in the form logical definitions, and determines a combination of an item string and a data string as keywords. For example, combinations are created based on the relative positional relationships between item strings and data strings, and with created combinations as nodes, integrity of two combinations is evaluated. If the integrity is verified between the two combinations, the corresponding nodes are connected with a path. Thereby, a graph is created. Then cliques are extracted from the graph, an evaluation value of each clique is calculated, and by determining the best clique, a combination of an item string and a data string is determined.

The following describes how such the form processing apparatus 1 operates.

In the form logical definition database 14, form logical definitions defining the logical structures of forms to be processed are previously stored.

When a form image is entered, the layout recognizer 11 extracts a readout region containing the character images through the layout recognition. The character recognizer 13 consults the recognition dictionary stored in the recognition dictionary database 12 to recognize the characters within the extracted readout region, thus obtaining a character recognition result from the recognized characters. By performing this process, the characters existing in the form image are recognized and output to the possible string extractor 15 as the character recognition result.

The possible item string extractor 15a extracts, from the character recognition result, characters which are included in the item strings defined in the form logical definitions stored in the form logical definition database 14, and casts the extracted characters for the corresponding characters of the defined item strings. Then, the possible item string extractor 15a evaluates positional integrity between the cast characters, obtains combinations of characters each of which satisfies relationships of a string, and determines possible item strings. On the other hand, the possible data string extractor 15b extracts portions which can be value portions of the normal expressions, from the character recognition result, based on the data region attributes defined in the form logical definitions, and collects them as a value portion. Further, the possible data string extractor 15b processes the value portion extracted from the character recognition result and the strings of normal expressions, and determines and extracts combinations each of which satisfies relationships of a string as possible data strings, in the same way as the possible item string extractor 15a. The linking unit 16 links the possible item strings and the possible data strings determined by the possible string extractor 15 according to the positional relationships between an item and data defined in the form logical definitions, and determines a combination of a possible item string and a possible data string.

By performing the above process for each category, keywords for all categories are extracted.

As described above, the form processing apparatus 1 according to this invention selects a character group with the highest degree of matching out of character groups each of which is a combination of recognized characters which satisfies relationships of a string defined in the form logical definitions defining keywords. Therefore, even if the character recognition result has some erroneous recognition, the matching can be done with the other correct recognition, resulting in realizing the correct matching. Similarly, even if the layout recognition is failed and therefore the character recognition result does not show correct character arrangement, the correct matching can be realized. Further, if there is a plurality of combinations of an item string and a data string, a combination with the highest integrity can be extracted, which results in obtaining the correct result.

The specific embodiment will now be described with reference to accompanying drawings.

Figure 2:
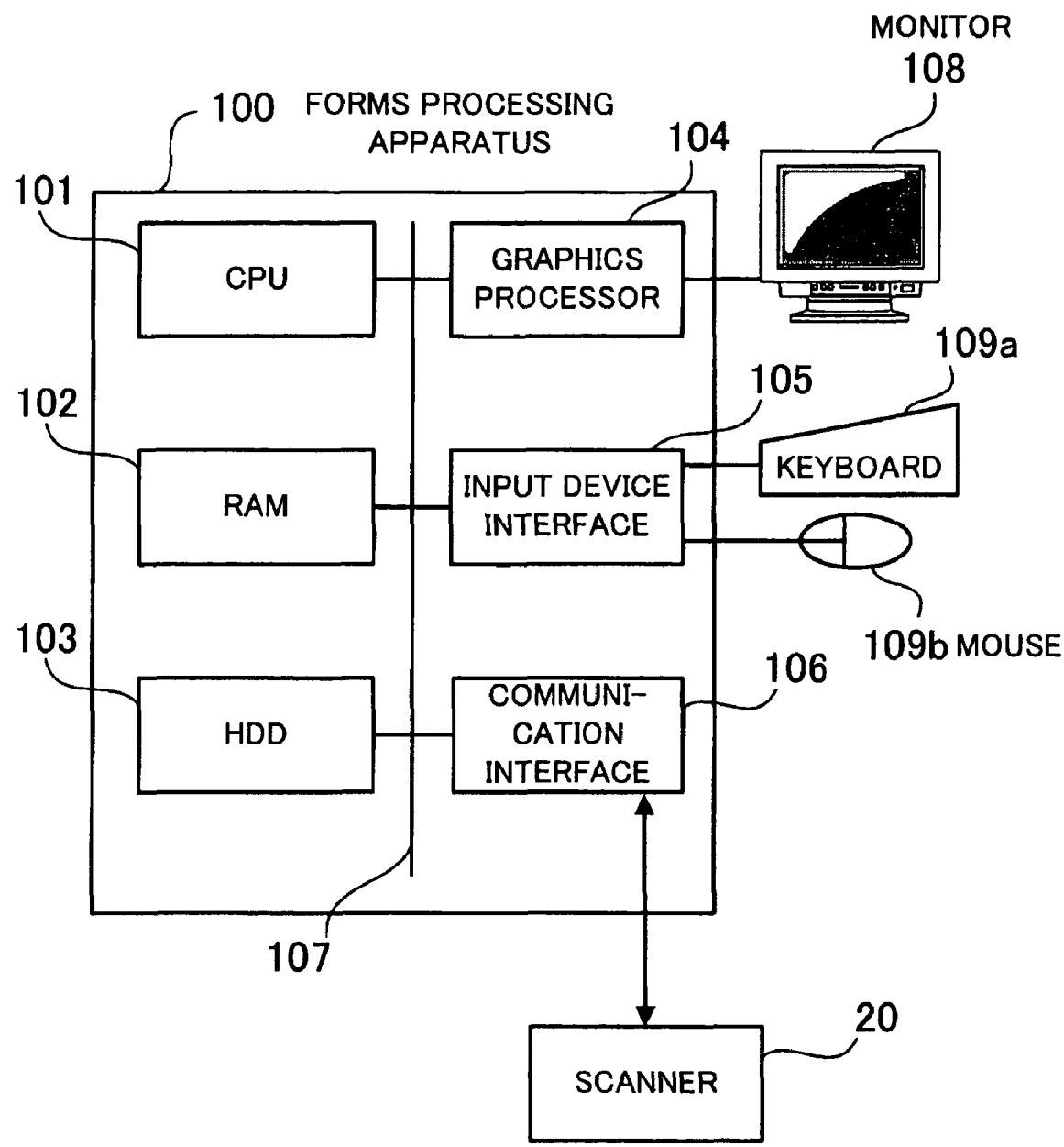
FIG. 2 shows an example of the hardware configuration of a form processing apparatus according to the embodiment.

FIG. 2 shows an example of the hardware configuration of a form processing apparatus according to this embodiment.

The form processing unit 100 is entirely controlled by a Central Processing Unit (CPU) 101. Connected to the CPU 101 with a bus 107 are a Random Access Memory (RAM) 102, a hard disk drive (HDD) 103, a graphics processor 104, an input device interface 105, and a communication interface 106.

The RAM 102 temporarily stores a part of the Operating System (OS) program and application programs to be executed by the CPU 101. In addition, the RAM 102 stores various kinds of data for CPU processing. The HDD 103 stores the OS and application programs. The graphics processor 104 is connected to a monitor 108 and is designed to display images on the screen of the monitor 108 under the control of the CPU 101. The input device interface 105 is connected to a keyboard 109a and a mouse 109b and is designed to transfer signals from the keyboard 109a and the mouse 109b to the CPU 101 through the bus 107. The communication interface 106 is connected to a scanner 20, and is designed to transfer form image data scanned by the scanner 20 to the CPU 101 through the bus 107. It should be noted that the scanner 20 can be directly connected with the bus 107.

The processing functions of this embodiment can be realized by such a hardware configuration.

Figure 3:
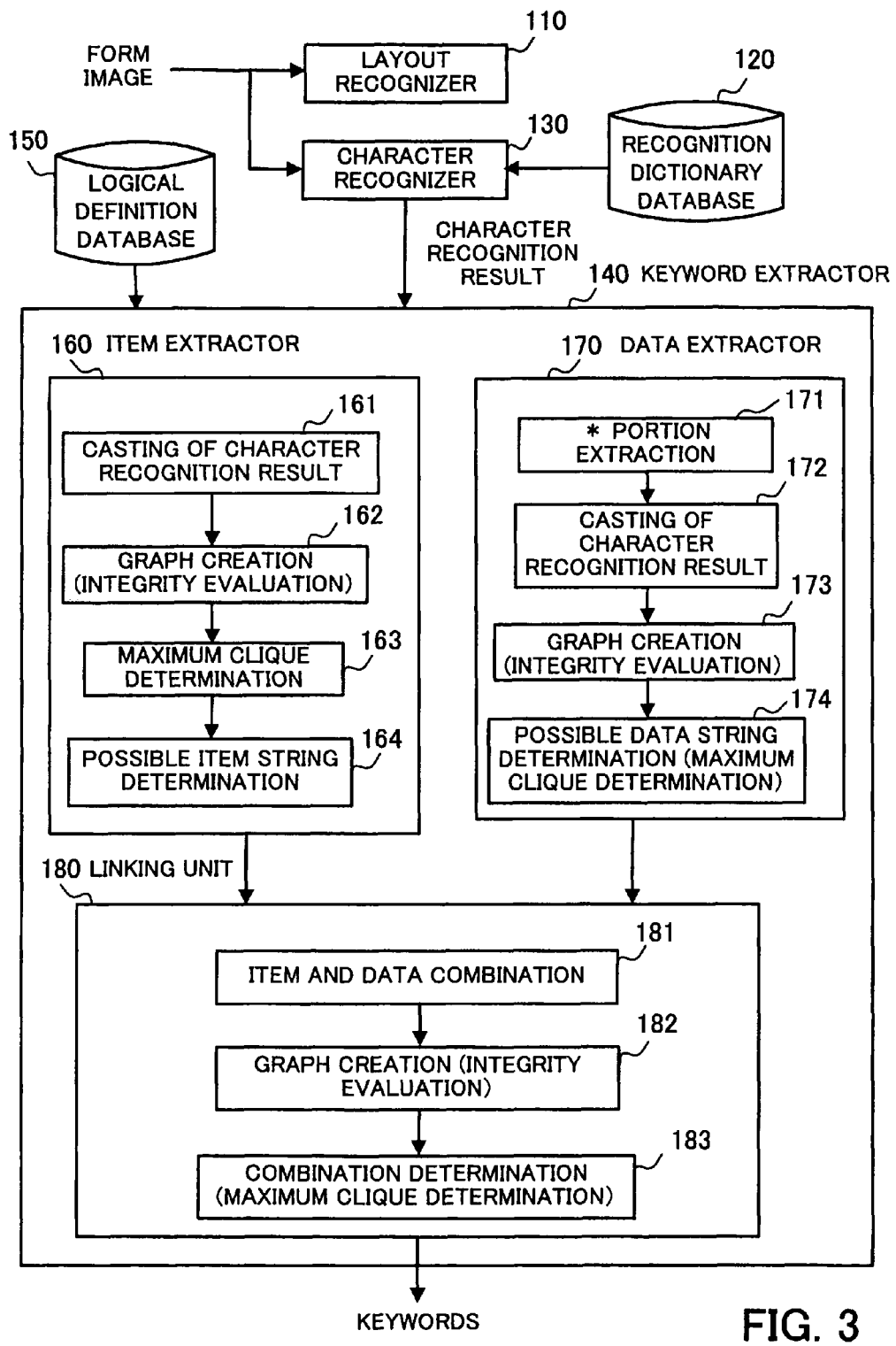
FIG. 3 shows an example of the software configuration of the form processing apparatus according to the embodiment.

Now the software configuration to realize the processing functions of the form processing apparatus 100 will be described with reference to FIG. 3.

The form processing apparatus 100 has processing units including the layout recognizer 110, a character recognizer 130 and a keyword extractor 140, and databases including a recognition dictionary database 120 and a logical definition database 150.

The keyword extractor 140 has an item extractor 160 for extracting possible item strings, a data extractor 170 for extracting possible data strings, and a linking unit 180 for linking the possible item strings and the possible data strings.

The layout recognizer 110 is a layout recognition means that recognizes the layout of a form image scanned by a scanner and extracts a readout region containing character images.

The recognition dictionary database 120 stores dictionary information to be used for character recognition.

The character recognizer 130 is a character recognition means that recognizes characters within the readout region extracted by the layout recognizer 110, through the character recognition, and outputs a character recognition result.

The logical definition database 150 stores form logical definitions (hereinafter, referred to as logical definitions) defining logical structures which are common to forms of same type. For example, for estimate forms, "date information" and "request number" are included. Therefore, it can be assumed that the forms of same type have many common things, such as information items, even if they have different layouts. The logical structures define these common things. The logical structures of forms comprise a set of meaning, item, and data, and relationships among them. The meaning expresses a functional role in the form. The item shows strings which are considered to be written in forms as the functional role of a corresponding meaning. The data is an actual value of the functional role of a corresponding meaning. The relationships among them mean relationships between the sets, and may be link relationships or an equation. The logical definition database 150 defines item strings for an item, and data region attributes for data, which will be described in detail later.

The item extractor 160 realizes its processing functions with modules including casting of character recognition result 161, graph creation (integrity evaluation) 162, maximum clique determination 163, and possible item string determination 164. The casting of character recognition result 161 compares a character recognition result to the characters included in the item strings defined in the logical definitions. When a matching character is detected in the character recognition result, it is cast for a corresponding character of the defined item strings. The graph creation (integrity evaluation) 162 evaluates the integrity between characters obtained by the casting of the character recognition result, and creates a graph. More specifically, with the cast characters as nodes, it is determined whether there is integrity in terms of positional relationships of a string between the characters. For example, as the positional relationships, the arrangement order of the characters of an item string (if "ORDER NUMBER") is defined as an item string, "R" and "D" should come after "O") and positional relationships between characters (the characters should be arranged on the same line) are defined in the logical definition database 150. The integrity is determined according to such positional relationships. When it is judged that two characters have integrity, the nodes corresponding to the characters are connected with a path. This process is successively performed on every character (node), and thereby a graph is created. The maximum clique determination 163 extracts cliques from the graph created by the graph creation (integrity evaluation) 162, selects appropriate cliques and determines the maximum clique with the highest degree of matching. A degree of matching can be calculated based on the ratio of nodes to a character group including the clique. If a plurality of item strings are defined for one category, the maximum clique is determined for each of the item strings. Then, one possible item string is selected for the category. The possible item string determination 164 outputs as a possible item string one of the item strings belonging to the category, based on the maximum clique with the highest degree of matching out of the maximum cliques detected by the maximum clique determination 163.

The following describes a graph. A graph is a concept of "dots and lines connecting them" which is abstracted with focusing on "a way of connecting" a group of nodes (nodal and top points) and a group of paths (branches and sides) connecting the nodes, and a graph theory is used for searching for various kinds of properties that a graph has. In addition, a group of top points having a path between all pairs of the top points in the graph is called a clique, and a technique of extracting the maximum clique from cliques is called maximum clique extraction. A technique of extracting the maximum clique in a graph is well known, and for example, is disclosed in "C. Bron and J. Kerbosch, "Finding all cliques of an undirected graph", Commun. ACM, Vol. 16, No. 9, pp. 575 to 577, 1973).

The data extractor 170 realizes its processing functions with modules including * (asterisk) portion extraction 171, casting of character recognition result 172, graph creation (integrity evaluation) 173, and possible data string determination (maximum clique determination) 174. Unlike items represented by fixed strings, data cannot be fixed by characters. Instead, styles of expressing data (hereinafter, referred to as normal expressions) and the character types of data can be defined. For example, a date is represented by "(month)*, *". * represents any numerals or signs. This sign "*" which is usable instead of any characters is called a wild card. The * portion extraction 171 collectively extracts wild card portions of data from a character recognition result, and takes them as a * portion all together. The casting of character recognition result 172 performs casting on the strings and the * portions which are extracted from the character recognition result and are included in the normal expressions of the data, in the same way as the casting of character recognition result 161. Then the graph creation (integrity evaluation) 173 creates a graph, in the same way as the graph creation (integrity evaluation) 162, and the possible data string determination (maximum clique determination) 174 determines the maximum clique with the highest degree of matching as a possible data string, in the same way as the possible item string determination 164.

The linking unit 180 realizes its processing functions with modules including item and data combination 181, graph creation (integrity evaluation) 182, and a combination determination (maximum clique determination) 183. The item and data combination 181 detects all possible combinations from among the possible item strings extracted by the item extractor 160 and the possible data strings extracted by the data extractor 170. The graph creation (integrity evaluation) 182 takes the detected combinations as nodes, and creates a graph by connecting with a path nodes corresponding to combinations having integrity in terms of positional relationships. The combination determination 183 determines the maximum clique with the highest integrity from the graph. That is, a combination of an item string and a data string with the highest integrity is determined.

The following describes how the form processing apparatus 100 operates and processes forms.

First the logical definitions to be stored in the logical definition database 150 will be described with reference to FIG. 4.

The logical definitions define meanings, items, and data which form logical structures.

Keywords are classified into categories 201 according to their meanings. In the example shown in this figure, a date 210 and a form number 220 are defined.

As to an item, strings expressing a meaning, that is, item strings 202 are defined for each category. Referring to this figure, "DATE" and "ISSUE DATE" are defined for the date 210. In addition, "YOUR RECEPTION" and "ORDER NUMBER" are defined for the form number 220.

As to data, as an actual value and data region attributes corresponding to a meaning, characters 203 and normal expressions 204 to be used for the data are defined, respectively, for each category. As the characters to be used for data 203, characters types to be used for actual values are defined. For example, for the date 210, it is defined that data is written in "numerals". As the normal expressions to be used for data 204, the expression styles of data are defined. For example, for the date 210, expression styles of "*/*/*" and "(month) *,*" are used.

Further, the relative position 205 of data with respect to an item, characters 206 that may exist between an item and data, and so on are defined for each category according to necessity. For example, for the date 210, "right" and "below" are defined. This means that data should be arranged on the right side of or below a region where an item is arranged. In addition, as characters 206 that may exist between an item and data, ":" is defined. This means that, if ":" exists between an extracted possible item string and possible data string, integrity is verified therebetween.

The following describes what process is performed when a form image is entered. When a form image is entered, the layout recognition process of the layout recognizer 110 and the character recognition process of the character recognizer 130 will be performed in order. This will be described by using an exemplary form image.

Figure 5:
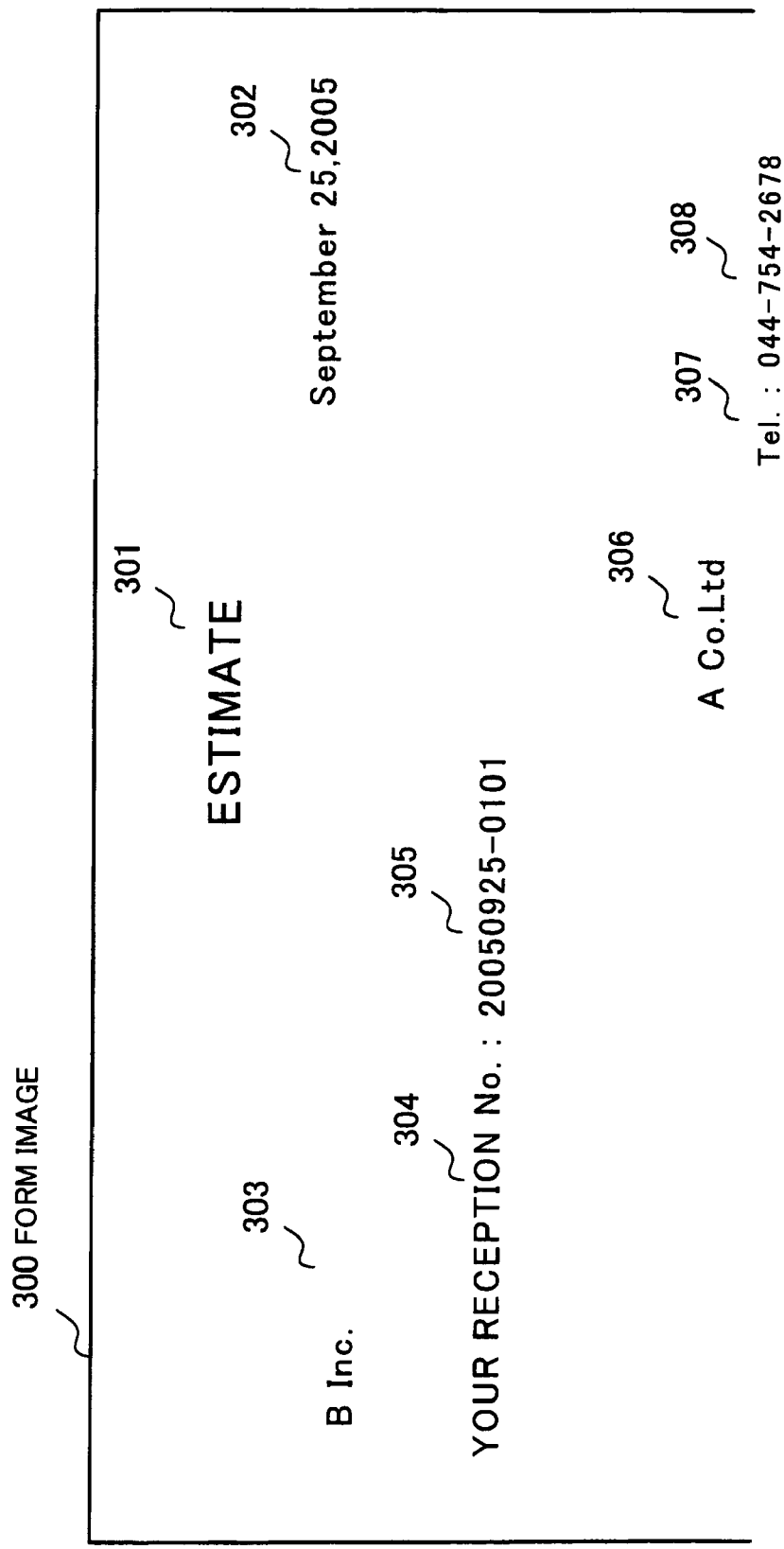
FIG. 5 shows an example of a form image to be entered into the form processing apparatus according to the embodiment.

FIG. 5 shows an example of a form image to be entered in the form processing apparatus according to this embodiment.

A form image 300 is a part of "ESTIMATE" form, and the layout recognizer 110 enters the form image 300 and extracts a readout region through the layout recognition process. The character recognizer 130 recognizes characters of all character types within the readout region through the character recognition process. In the case of the form image 300, "ESTIMATE" 301, "Sep. 25, 2005" 302, "B Inc." 303, "YOUR RECEPTION No." 304, "20050925-0101" 305, "A Co. Ltd" 306, "Tel." 307, and "044-754-2678" 308 are output as a character recognition result.

In this connection, in this character recognition, characters to be recognized can be limited based on the logical definitions stored in the logical definition database 150. For example, for the date 210 of FIG. 4, only strings representing months and numerals are used as characters, and therefore only these characters may be recognized through the character recognition. Similarly, for the form number 220, characters to be recognized can be limited to "O", "R", "D", "E", "N", "U", "M", "B", "Y", "U", "C", "P", "T", "I" and numerals. By collecting characters to be recognized for all categories and using them as recognition targets in the character recognition, the character recognition can enhances its accuracy.

Then, the keyword extractor 140 starts its processing. The keyword extraction process includes extraction of possible item strings by the item extractor 160, extraction of possible data strings by the data extractor 170, and linking of the possible item strings and possible data strings by the linking unit 180.

(1) Item Extraction

In the item extraction process, an item string expressing an item is extracted from a character recognition result based on the item strings defined in the logical definitions.

First the casting of character recognition result 161 extracts, from the character recognition result, characters which are included in the item strings defined in the logical definitions stored in the logical definition database 150, and performs casting. It is assumed that "YOUR RECEPTION No.", "ORDER NUMBER", and "RECEPTION NUMBER" are defined as item strings for the form of the form image 300. From the character recognition result, characters which are included in the defined item strings are extracted.

Figure 6:
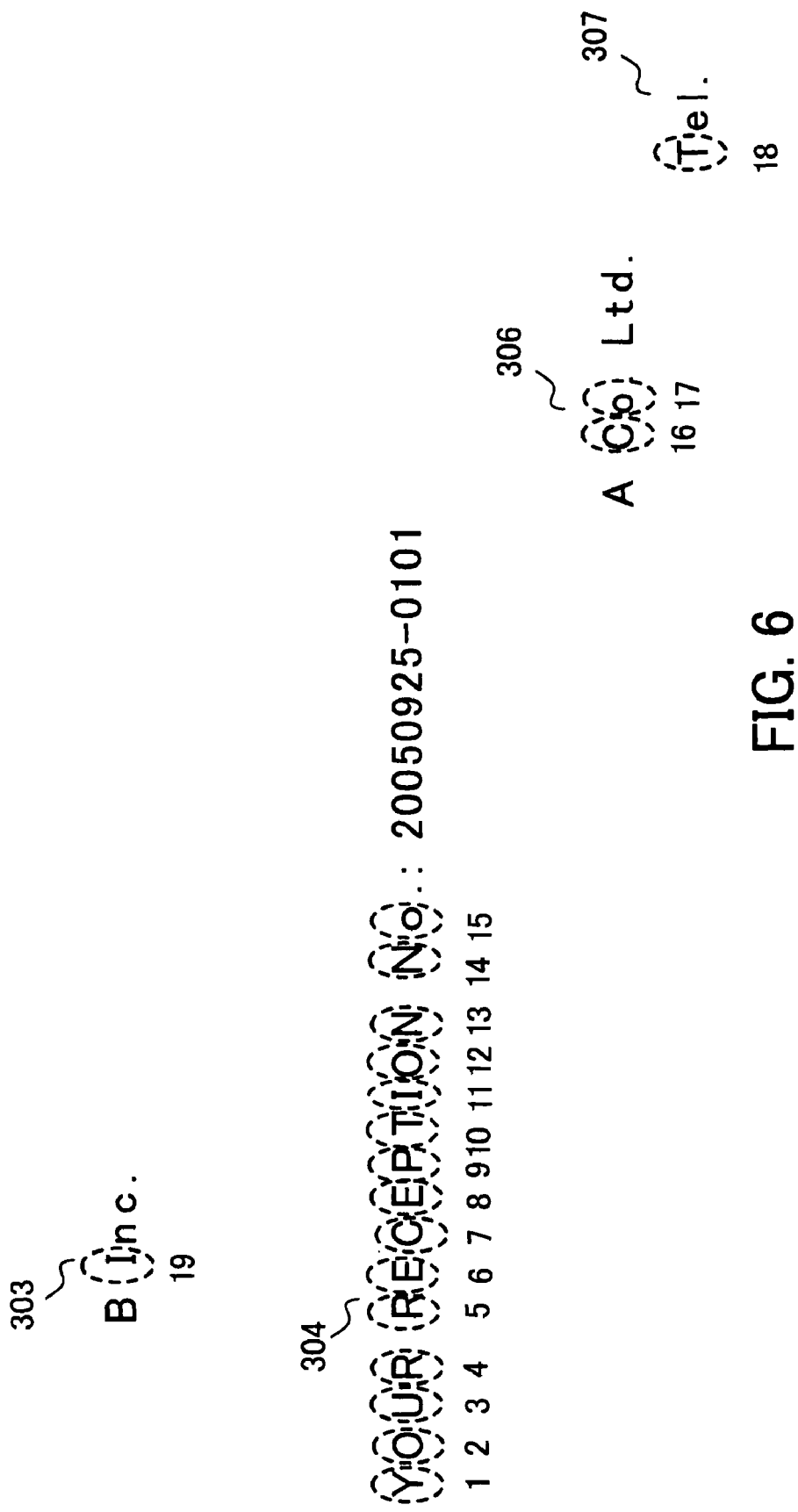
FIG. 6 shows extraction of characters from a character recognition result according to the embodiment.

FIG. 6 shows extraction of characters from a character recognition result according to the embodiment, that is, the portions of characters extracted from the form image 300, and has the same reference numerals as FIG. 5.

Characters which are defined in the item strings are sequentially extracted from the character recognition result. At this time, the extracted characters are labeled with numerals for the sake of convenience. For example, out of "YOUR RECEPTION No." 304, "Y(1)", "O(2)", "U(3)", "R(4)", "R(5)", "E(6)", "C(7)", "E(8)", "P(9)", "T(10)", "I(11)", "O(12)", "N(13)", "N(14)", and "o(15)" are extracted. Similarly, "C(16)" and "o(17)" out of "A Co. Ltd." 306, "T(18)" out of "Tel." 307, and "I(19)" out of "B Inc." 303 are extracted. Then, the extracted characters are cast for the corresponding characters of the item strings.

Figure 7:
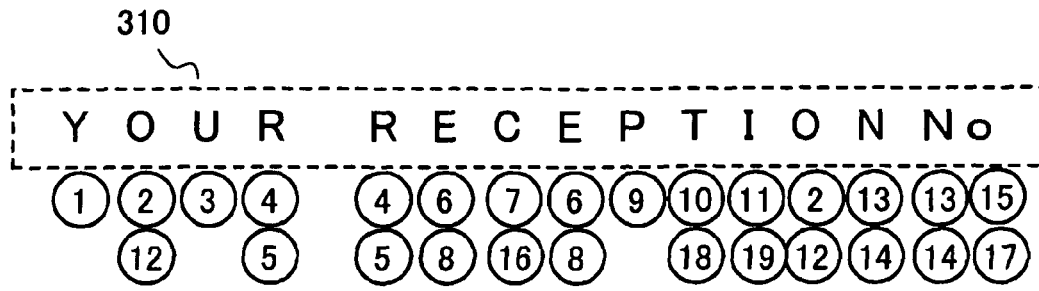
FIG. 7 shows a casting result in an item string matching process according to the embodiment.
Figure 7:
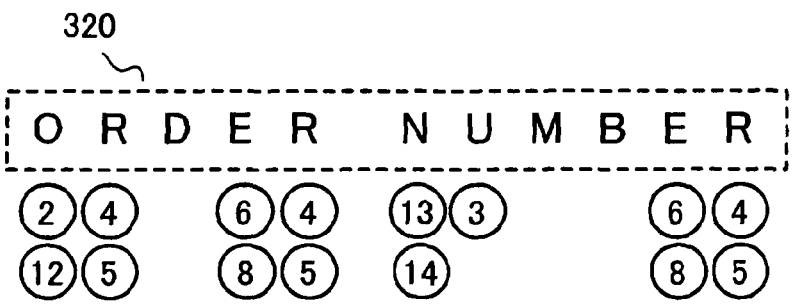
Figure 7:
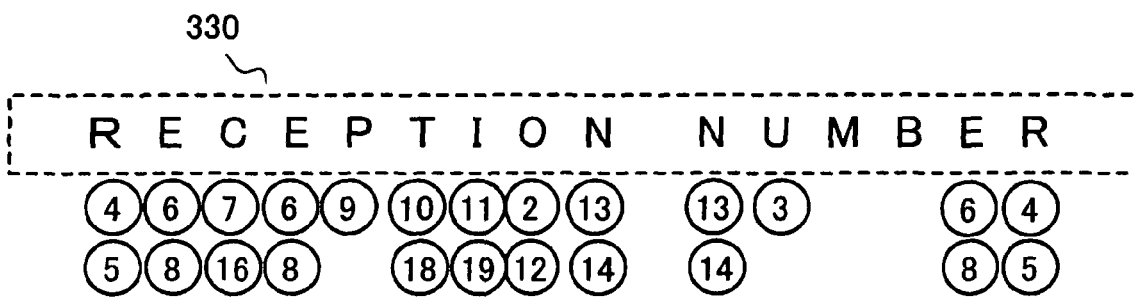

FIG. 7 shows a casting result in an item string matching process according to this embodiment, and has the same reference numerals as FIG. 6.

Regarding the defined item string "YOUR RECEPTION No" 310, (1) is cast for "Y", (2) and (12) for "O", (3) for "U", (4) and (5) for "R", (4) and (5) for "R", (6) and (8) for "E", (7) and (16) for "C", (6) and (8) for "E", (9) for "P", (10) and (18) for "T", "11" and "19" for "I", (2) and (12) for "O", (13) and (14) for "N", (13) and (14) for "N", and (15) and (17) for "o". Similarly, regarding the defined item string "ORDER NUMBER" 320, (2) and (12) are cast for "O", (4) and (5) for "R", (6) and (8) for "E", (4) and (5) for "R", (13) and (14) for "N", (3) for "U", (6) and (8) for "E", and (4) and (5) for "R". Regarding the defined item string "RECEPTION NUMBER" 330, (4) and (5) are cast for "R", (6) and (8) for "E", (7) and (16) for "C", (6) and (8) for "E", (9) for "P", (10) and (18) for "T", (11) and (19) for "I", (2) and (12) for "O", (13) and (14) for "N", (13) and (14) for "N", (3) for "U", (6) and (8) for "E", and (4) and (5) for "R".

The graph creation (integrity evaluation) 162 creates a graph with the cast characters as nodes, based on the casting result. First, regarding all pairs of cast characters out of all the cast characters, the relationships of a string and positional integrity are checked. It can be said that two characters A and B have positional integrity when one of the characters is the i-th character and the other is the j-th character in a corresponding item string (here, i<j), x coordinate of A<x-coordinate of B, and y-coordinate of A is almost equal to y-coordinate of B. In this connection, x represents a horizontal coordinate axis while y represents a vertical coordinate axis.

More specifically, it is assumed that the average size of characters is m, $y_A$ is y-coordinate of A and $y_B$ is y-coordinate value of B, and the following equation (1) is satisfied.

$$|y_A - y_B| \leq m/2 \quad (1)$$

The average size of characters is an average of the long-side lengths of the circumscribed rectangles of all the characters.

However, in the case of handwritten characters, such a condition is considered very strict that the y-coordinate of A and y-coordinate of B are almost equal to each other. Therefore, this condition is loosed and the integrity is determined by using the following equation (2), instead of the equation (1).

$$|y_A - y_B| \leq m \quad (2)$$

In this way, the criterion for integrity is appropriately set according to forms.

When integrity between two characters is verified, the nodes corresponding to the two characters are connected with a path, thereby creating a graph.

Figure 8:
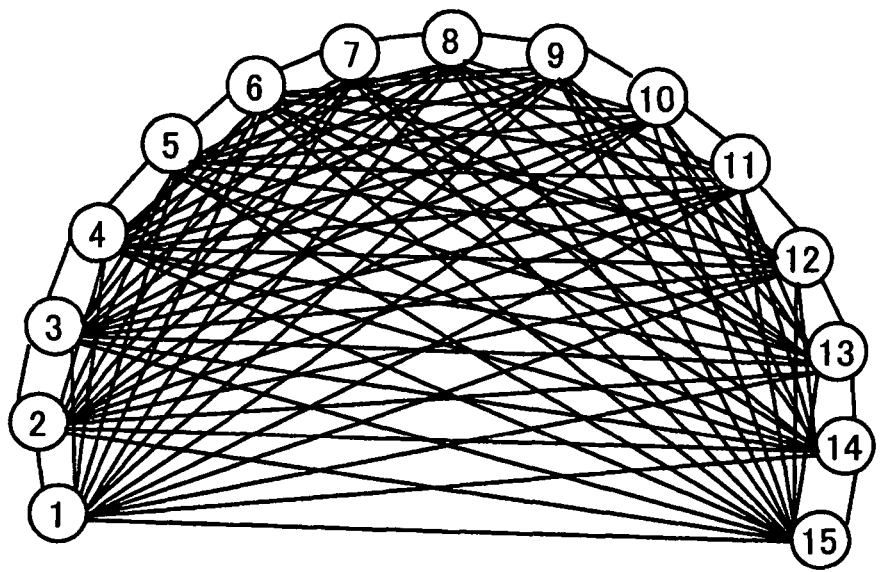
FIG. 8 shows an example of a graph created according to the embodiment.
Figure 8:
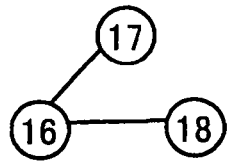
Figure 8:
Figure 8:
Figure 8:
Figure 8:

FIG. 8 shows an example of a created graph according to the embodiment. The nodes have numerals (1), (2), (3), (4), (5), (6), (7), (8), (9), (10), (11), (12), (13), (14), (15), (16), (17), (18), and (19) given to corresponding characters shown in FIG. 6.

For example, regarding "Y (1)", a character which is "O", "U", "R", "R", "E", "C", "E", "P", "T", "I", "O", "N" "N", or "o" included in the item string "YOUR RECEPTION No" and satisfies the equation (1) for the positional relationships can be judged as having integrity. Therefore, "O (2)", "U (3)" "R (4)", "R (5)", "E (6)", "C (7)", "E (8)", "P (9)", "T (10)", "I (11)", "o (12)", "N (13)", "N (14)", and "o (15)" are judged as having integrity and connected to "Y (1)" with a path. By repeating the same process for each node, the graph shown in FIG. 8 will be obtained.

From the created graph, cliques, which are partial complete graphs of a graph, are extracted. Every node forming a clique are connected to all nodes other than the own node with a path in the clique.

Referring to this figure, "1, . . . , 15", "16, 17, 18", and "19" are extracted as cliques.

When the form processing apparatus 100 actually performs this process, an integrity graph table in which the graph shown in FIG. 8 is represented in tabular form is used. FIG. 9 shows an example of the integrity graph table in the form processing apparatus according to the embodiment.

In the integrity graph table 350, nodes are arranged vertically and horizontally, and a path status is set in the column at each intersecting point. "1" represents a connection with a path. "0" represents a not-connection with a path. By tracking columns with "1", cliques can be extracted.

Then, the maximum clique determination 163 selects only appropriate cliques from the extracted cliques. For example, only cliques which have the number of nodes greater than a prescribed threshold are selected. Thereby only cliques having acceptable matching to item strings are selected. In the case where the threshold is set to two in this example, "19" out of the extracted cliques, "1, . . . , 15", "16, 17, 18", and "19", is excluded. A clique which has only one-character matching to an item string cannot be considered to be the item string, and therefore this clique is excluded from cliques.

Then, the remaining cliques are examined in terms of validity of their character arrangements. With respect to a character group corresponding to a clique on the image, a center point of characters forming a region surrounding the character group (the center point of the region) is calculated by dividing the length of the region by the number of characters. Then, the difference between the calculated center point and an actual center point of characters is obtained, and if the difference exceeds a prescribed threshold, the clique is considered to be inappropriate and is deleted. Specifically, it is assumed that the average size of characters is m, the number of characters is n, the difference of each character is d, and the following equation (3) is satisfied.

$$\frac{1}{n}\sum_{i=1}^{n} di \leq m \quad (3)$$

Figure 10:
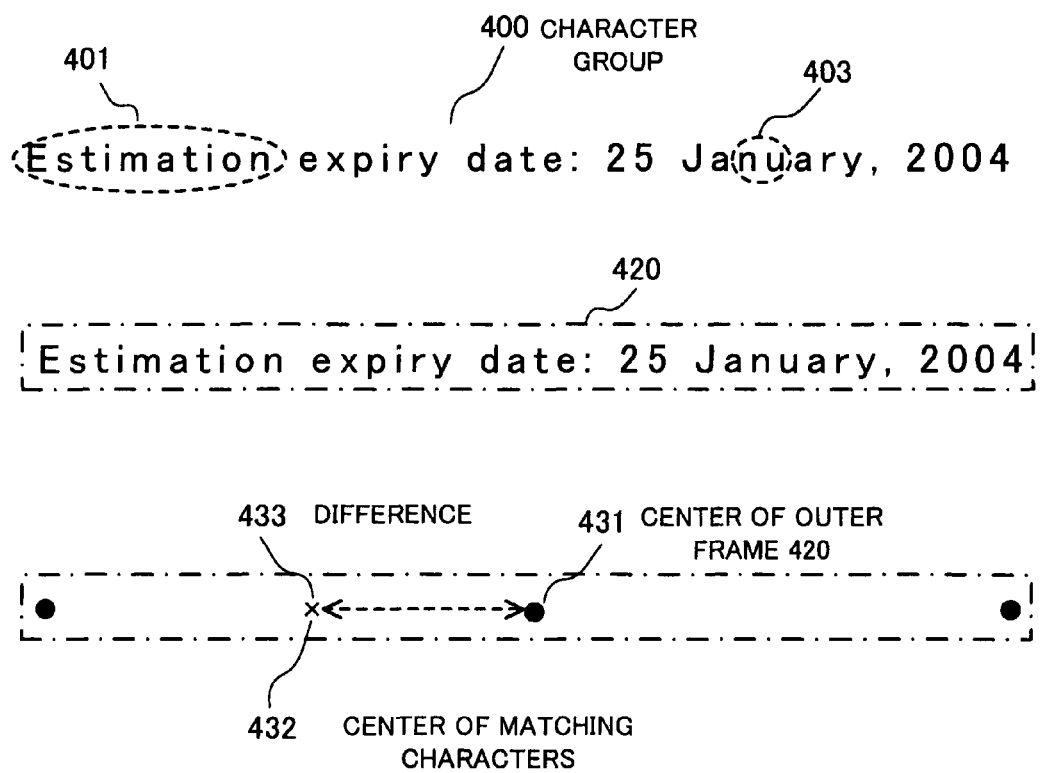
FIG. 10 shows an example of validity verification in terms of character arrangement according to the embodiment.

In this connection, the average size of characters is obtained as an average of the long-side lengths of the circumscribed rectangles of all the characters. One example will be described. FIG. 10 shows an example of validity verification in terms of character arrangement according to this embodiment.

Out of a character group "Estimation expiry date 25 Jan., 2004" 400 corresponding to a clique, "Estimation" 401 and "nu" 403 have matching. With respect to this character group 400, the length of the outer frame 420 surrounding the character group 400 is divided by the number of characters to thereby calculate the center point of the characters by using the number of characters forming the region. By doing so, the center 431 of the outer frame 420 is calculated. On the other hand, the center point 432 of the matching characters "Estimation", and "nu" is obtained. A difference 433 between the center point 431 of the outer frame 420 and the center point 432 of the matching characters is evaluated. In this example, the difference 433 is judged inappropriate from the equation (3).

In addition, when there are other characters between two characters on the image which are next to each other in a clique, this clique is judged inappropriate and is deleted. In this example of this figure, consider the case where an item string is "Estimation number". As there are other characters between "Estimation" 401 and "nu" 403, the clique corresponding to this is judged inappropriate.

By performing the above process, inappropriate cliques are deleted. Then, out of remaining cliques, the clique with the highest degree of matching is output as the maximum clique.

Then, the possible item string determination 164 compares the maximum cliques each determined for each of the item strings, in terms of the degree of matching, and determines the clique with the highest degree of matching as a possible item string. If some cliques have the same highest degree of matching, the cliques are all output. The degree of matching is calculated, for example, based on the number of nodes included in a character group or a ratio of matching characters to a string.

By performing the above process, a possible item string is determined.

After the extracted cliques are examined in terms of the number of nodes, the character arrangement, and noise, character re-recognition is performed by limiting character types based on the remaining cliques. More specifically, the character re-recognition may be performed, which searches for only the characters of item strings forming the remaining cliques. Out of character re-recognition results, only results whose recognition reliability is beyond a prescribed threshold remain, and the other results are deleted. Then, the casting, the graph creation, and the clique extraction are performed on the remaining character re-recognition results. The number of nodes forming each clique is counted, and this number is taken as an evaluation value of the clique. Then a clique with the highest evaluation value is output. If some cliques have the same highest evaluation value, they are all output.

The above case is that a string forming a keyword is arranged on a single line. However, there are many forms in a layout in which an item is written on plural lines. In such a case, when extracted cliques are taken as nodes and integrity is satisfied between two nodes, the nodes are connected with a path, so as to create a graph. Then the maximum clique is extracted, thereby identifying a possible string arranged on plural lines and its position.

Figure 11:
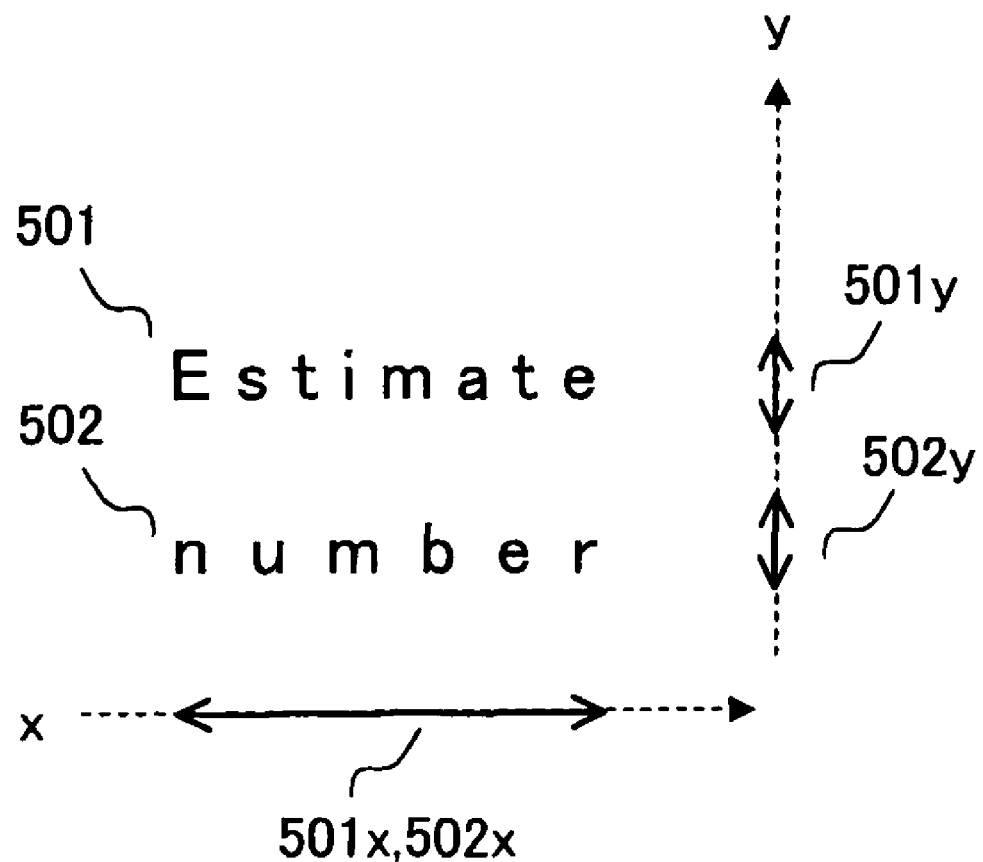
FIG. 11 shows an example of an item string which is written on plural lines.

FIG. 11 shows an example of an item string which is written on plural lines.

Consider two strings, "Estimate" 501 and "number" 502, corresponding to two cliques. When these strings do not overlap one above the other but overlap from side to side, the first character of one string comes after the last character of the other string, and the latter string is arranged below the former string on the image, the two strings are judged as having integrity.

Referring to this figure, as ranges $501y$ and $502y$ obtained by projecting the two strings in the y direction do not overlap, it can be judged that the two strings do not overlap one above the other. On the other hand, as ranges $501x$ and $502x$ obtained by projecting the two strings in the x direction overlap, it can be judged that the two strings overlap from side to side. In addition, with respect to the item string "Estimate number", the latter "number" 502 comes after and is arranged below "Estimate" 501 on the image.

Nodes (cliques) which satisfy prescribed conditions as described above are connected with a path, so as to thereby create a graph. Then cliques are extracted from the graph, and the maximum clique is extracted.

Figure 12:
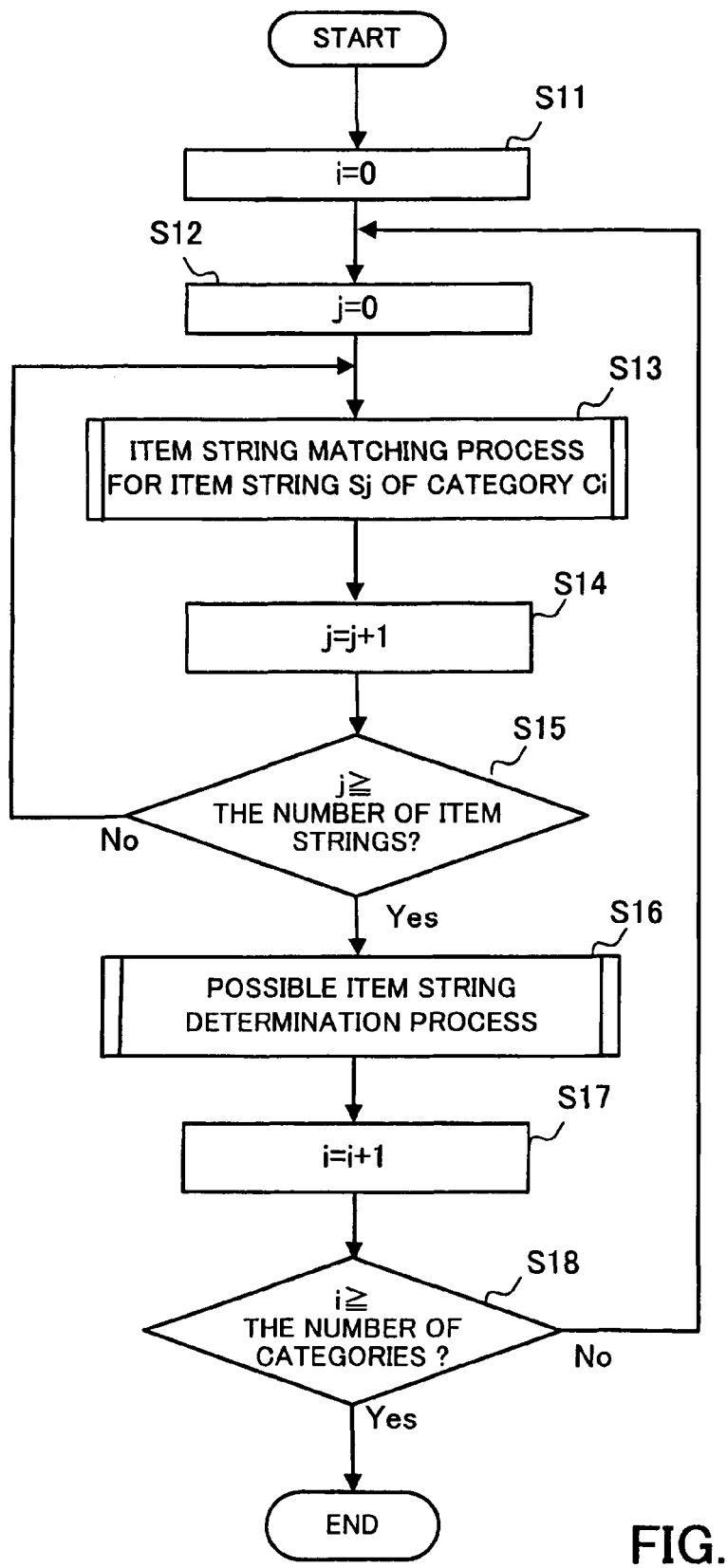
FIG. 12 is a flowchart showing how to perform an item extraction process, according to the embodiment.

The following describes the item extraction process with reference to a flowchart shown in FIG. 12.

This process is started when a character recognition result is entered.

At step S11, in order to perform the process for all categories defined in the logical definitions, i identifying i-th category (Ci) in process is initiated (i=0).

At step S12, in order to perform the process for all item strings defined in the category Ci, j identifying j-th item string (Sj) in process is initiated (j=0).

At step S13, the item string matching process is performed on the item string Sj of category Ci. This process will be described in detail later. By performing the matching process, the maximum clique for the item string Sj of category Ci is determined.

At step S14, in order to perform the process for the next item string, j is incremented by one.

At step S15, j is compared with the number of item strings defined in the logical definitions. If j does not reach the number of item strings, the process returns to step S13 to perform the matching process on the next item string. If j reaches the number of item strings, the process for all item strings is completed.

At step S16, by repeating the process from step S13 to step S15, the maximum cliques for all of the item strings of category Ci are determined, and then a possible item string determination process for category Ci is performed. This process will be described in detail later.

At step S17, in order to perform the process for the next category, i is incremented by one.

At step S18, i is compared with the number of categories defined in the logical definitions. If i does not reach the number of categories, the process returns to step S12 and the process is performed for the next category. If the process for all categories has been completed, the process is completed.

Figure 13:
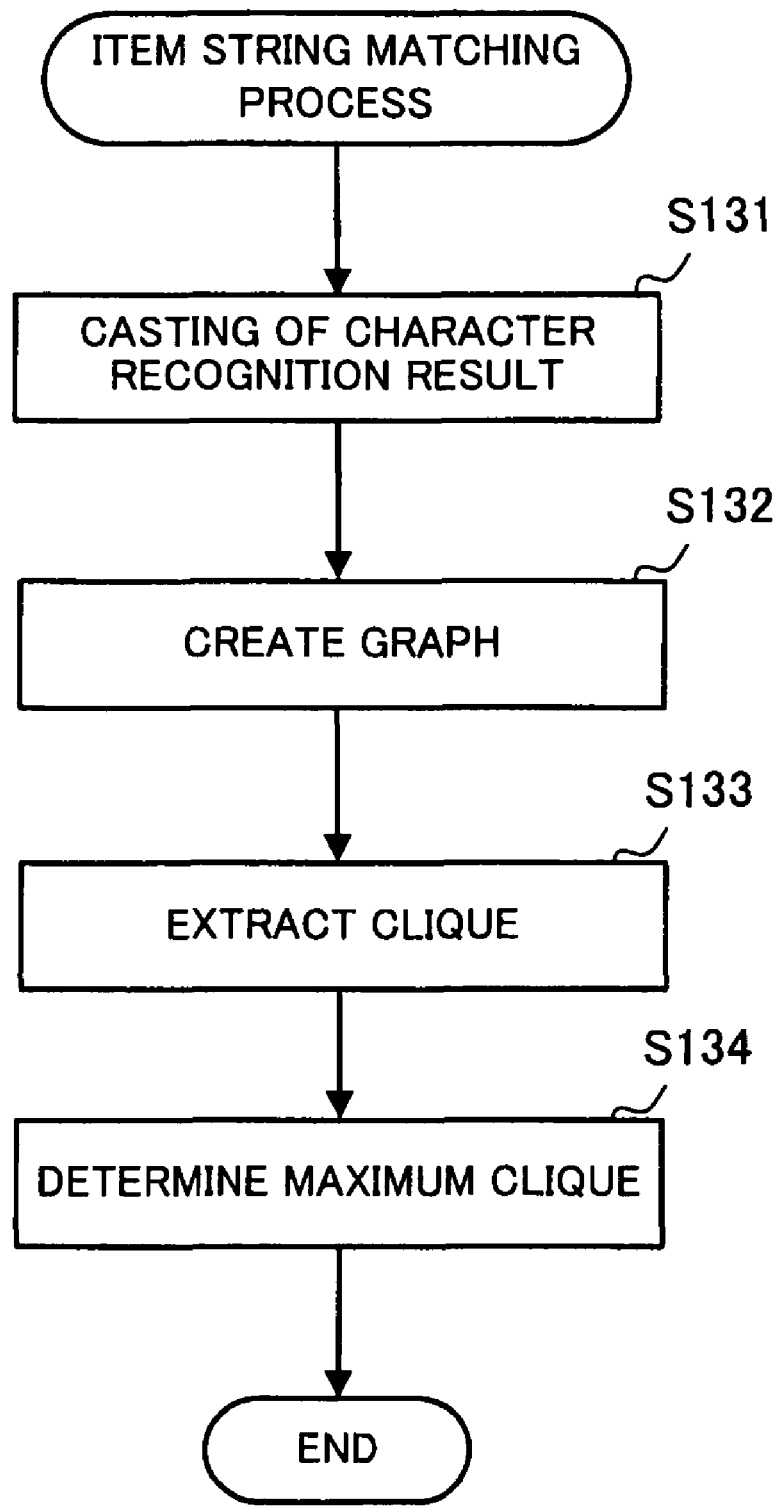
FIG. 13 is a flowchart showing how to perform the item string matching process, according to the embodiment.

The item string matching process will be described with reference to a flowchart shown in FIG. 13.

This process is started when an item string Sj is specified.

At step S131, characters which are included in the item string Sj defined in the logical definitions stored in the logical definition database 150 are extracted from the character recognition result and are cast.

At step S132, a graph is created based on the casting result with the cast characters as nodes. First with respect to all pairs of characters out of the cast characters, relationships of a string and positional integrity are checked, and when integrity is verified, the corresponding nodes are connected with a path, thereby creating a graph.

At step S133, cliques, which are partial complete graphs of a graph, are extracted from the graph created at step S132.

Every node forming a clique is connected with a path to all nodes other than the own node in the clique.

At step S134, out of the cliques extracted at step S133, only cliques each of which has the number of nodes greater than a prescribed threshold are selected. Further, validity of a clique in terms of the character arrangement is checked, and inappropriate cliques are deleted. Out of the remaining cliques, a clique with the highest degree of matching is selected and is output as the maximum clique.

By performing the above process, the maximum clique for the item string Sj of category Ci is extracted.

Figure 14:
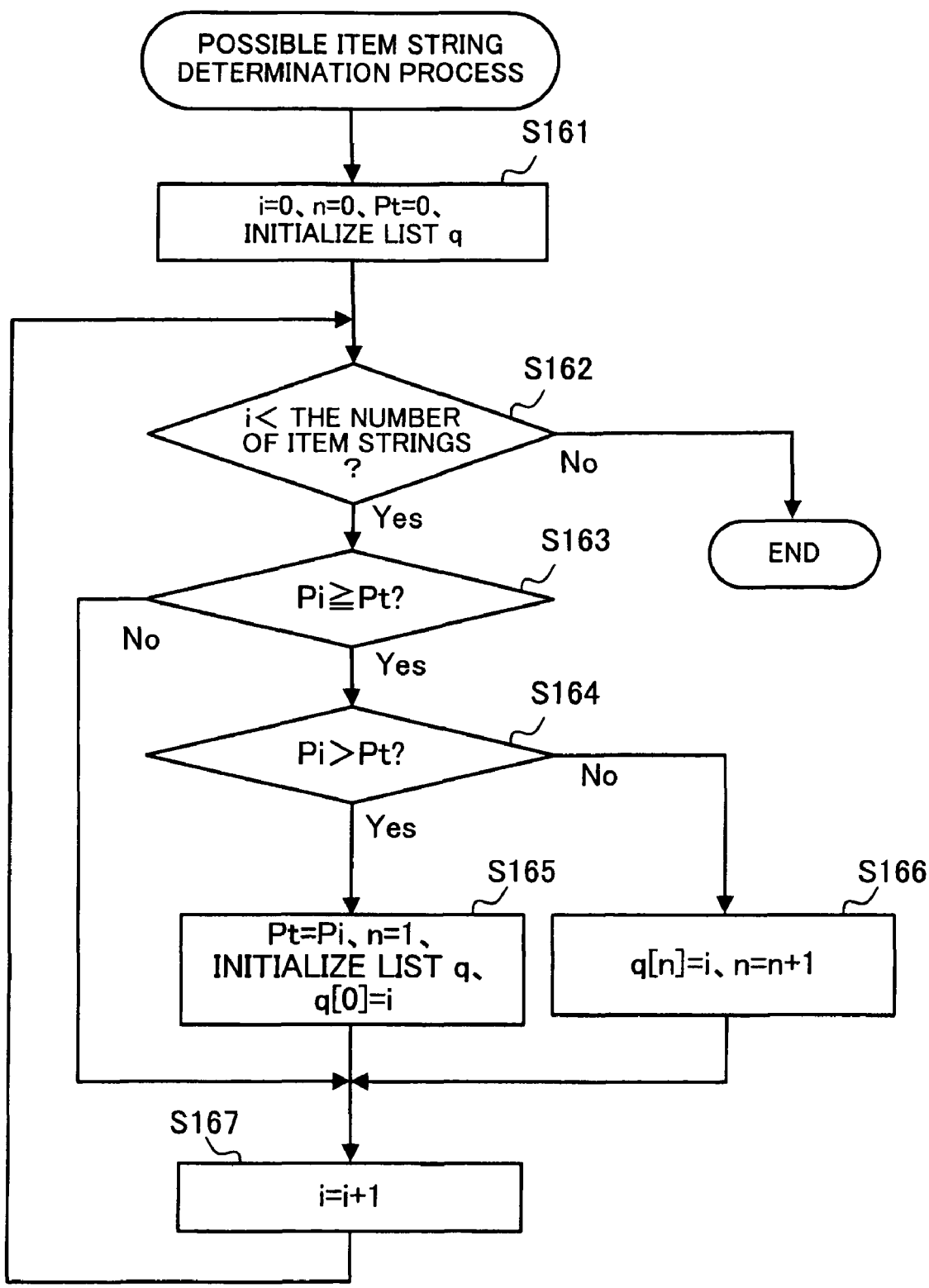
FIG. 14 is a flowchart showing how to perform a possible item string determination process, according to the embodiment.

Now the possible item string determination process will be described with reference to a flowchart shown in FIG. 14.

When the maximum cliques for the item strings of a category are determined, this process is started.

At step S161, it is assumed that Pi is a degree of matching of i-th item string, Pt is the highest degree of matching, list q shows a sequence number of a possible item string and lists q exist as many as the number of possible item strings, and n is the number of possible item strings. Each value is initiated. More specifically, i=0, n=0, and Pt=0, and list q is initiated.

At step S162, i is compared with the number of item strings defined in the category, if i reaches the number of item strings, this process is completed.

At step S163, as i does not reach the number of item strings, the degree of matching Pi of i-th item string is compared with the highest degree of matching Pt. More specifically, it is checked whether Pi≧Pt, and when Pi is lower than Pt, the current highest degree of matching Pt is considered to be still the highest, and the process goes on to step S167.

At step S164, when Pi≧Pt, then it is checked whether Pi>Pt. When Pi is not greater than Pt (Pi=Pt), the process goes on to step S166.

At step S165, When Pi is greater than Pt, Pt is set to Pi (Pt=Pi), the number of possible item strings n is set to 1, list q[0]=i is set, and then the process goes on to step S167. Thereby, i-th item string is now only a single possible item string q[0]=i.

At step S166, when Pi is equal to Pt, Pt remains and list q[n] set to i (q[n]=i) is added. Then the number of possible item strings is incremented by one. Thereby, there are now n possible item strings. There are lists q showing the sequence numbers of the n possible item strings with the highest degree of matching Pt.

At step S167, i is incremented by one and the process returns to step S162 to perform the process for the next item string.

By executing the above process, the number of possible item strings n and the possible item strings q[i] (0≦i<n) can be obtained.

(2) Data Extraction Process

The data extraction process is performed to extract, from a character recognition result, data which is defined in data normal expressions, based on the data normal expressions and data types of the logical definitions.

Many data of keywords in forms have specified types and arrangements of strings. The logical definitions define such data attributes as normal expressions. For example, "*/*/*", etc. are defined for the data of date keyword, "* yen", "¥ *", etc. are defined for an amount of money. The * portion extractor 171 reads out the types (numerals, etc.) of a * portion and other characters ("/ (slash)", ". (dot)", "- (hyphen)", etc.), which are defined as normal expressions, from the logical definition database 150, and extracts matching characters from the character recognition result. At this time, a condition that characters other than dot and hyphen should be larger than a certain size is imposed. A group of the extracted characters is taken as A. Then, a surrounding region is created by adding margins (margin of m on the right and left and margin of n at the top and bottom) to the circumscribed rectangular of a character belonging to A. Then the character is linked to another character which belongs to A, is the closest to the character, and has an overlapping y coordinate with the character. The linked characters in A are combined, and are extracted as a * portion of the region.

Figure 15:
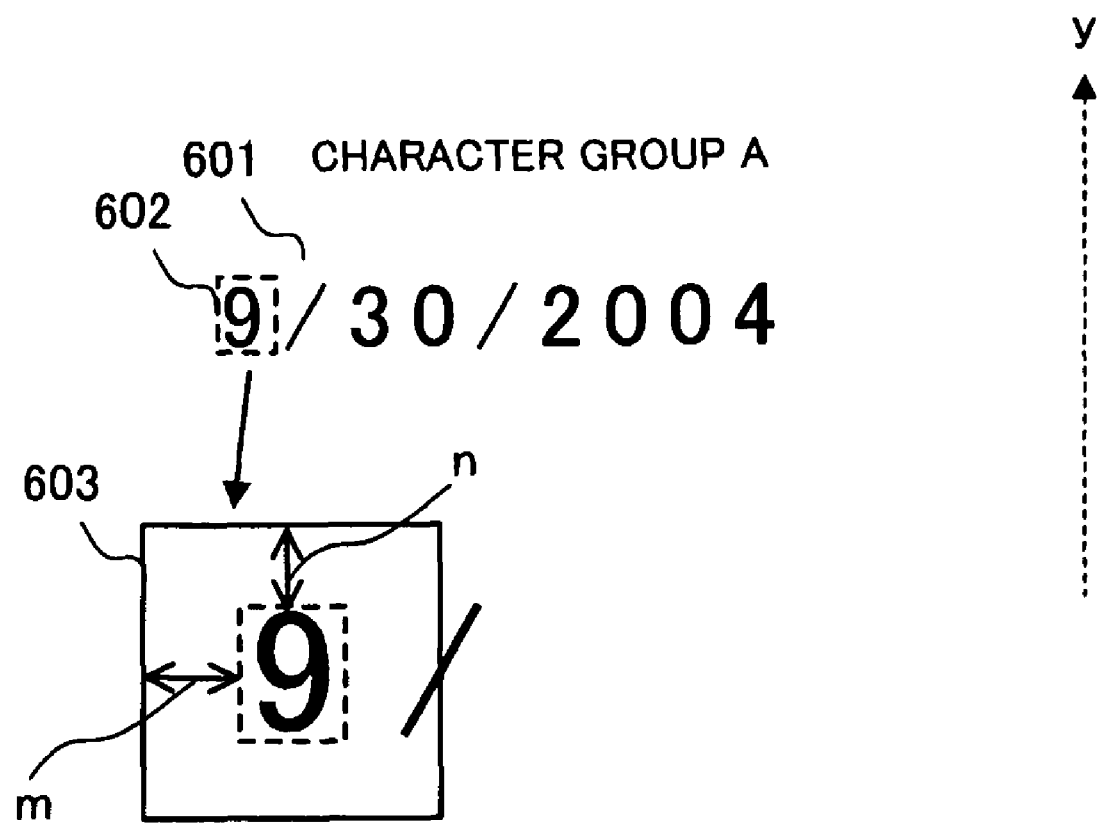
FIG. 15 shows an example of extraction of a * (asterisk) portion according to the embodiment.

One example will be described. FIG. 15 shows one example of extraction of a * portion according to this embodiment. This figure shows a case of extracting data which is defined in a normal expression of "*/*/*" (* is a numeral).

Based on the data types and normal expressions defined in the logical definitions, numerals are extracted from a character recognition result. In this example, it is assumed that a character group A (601) of "9/30/2004" is taken out. In the characters belonging to A, neighboring characters are linked to each other. In the case of "9", a surrounding region 603 obtained by adding a margin of m on the right and left and a margin of n at the top and bottom to the circumscribed rectangular 602 of "9" is set, and then "/" is linked to a character which belongs to A, exists within the surrounding region, is closest to "9", and has an almost same y-coordinate. In this example, "9" is linked to "/". Having an almost same y-coordinate means that the equation (1) is satisfied. By repeating the above process, all characters included in "9/30/2004" of the character group A (601) are linked one another, and "9/30/2004" is extracted as a * portion.

The casting of character recognition result 172 casts the character portions and the * portion which is indicated by * in the normal expressions, in the same way as the casting of character recognition result 161 of the item extractor 160. The casting is done for each character and for the * portion. In the case of the character group A (601), the casting of the characters "/", and the * portion "9 30 2004" is done.

The graph creation (integrity evaluation) 173 and the possible data string determination (maximum clique determination) 174 creates a graph, extracts cliques, and determine a maximum clique, in the same way as the graph creation (integrity evaluation) 162 and the maximum clique determination 163 of the item extractor 160. In the graph creation, with each of the cast characters and the * portion as a node, when two nodes have integrity in terms of positional relationships, the two nodes are connected with a path. In the maximum clique extraction, only cliques which have the number of nodes greater than a prescribed threshold are selected. If there are one or more other characters between two characters corresponding to two neighboring nodes of a clique on the image, the clique is judged inappropriate and is deleted. With respect to the remaining cliques having the number of nodes greater than the prescribed threshold, their regions and characters are all output.

It should be noted that, similarly to the item extractor 160, character types to be searched for can be limited based on the output cliques and the character re-recognition can be performed, so as to thereby revise characters to be output.

Figure 16:
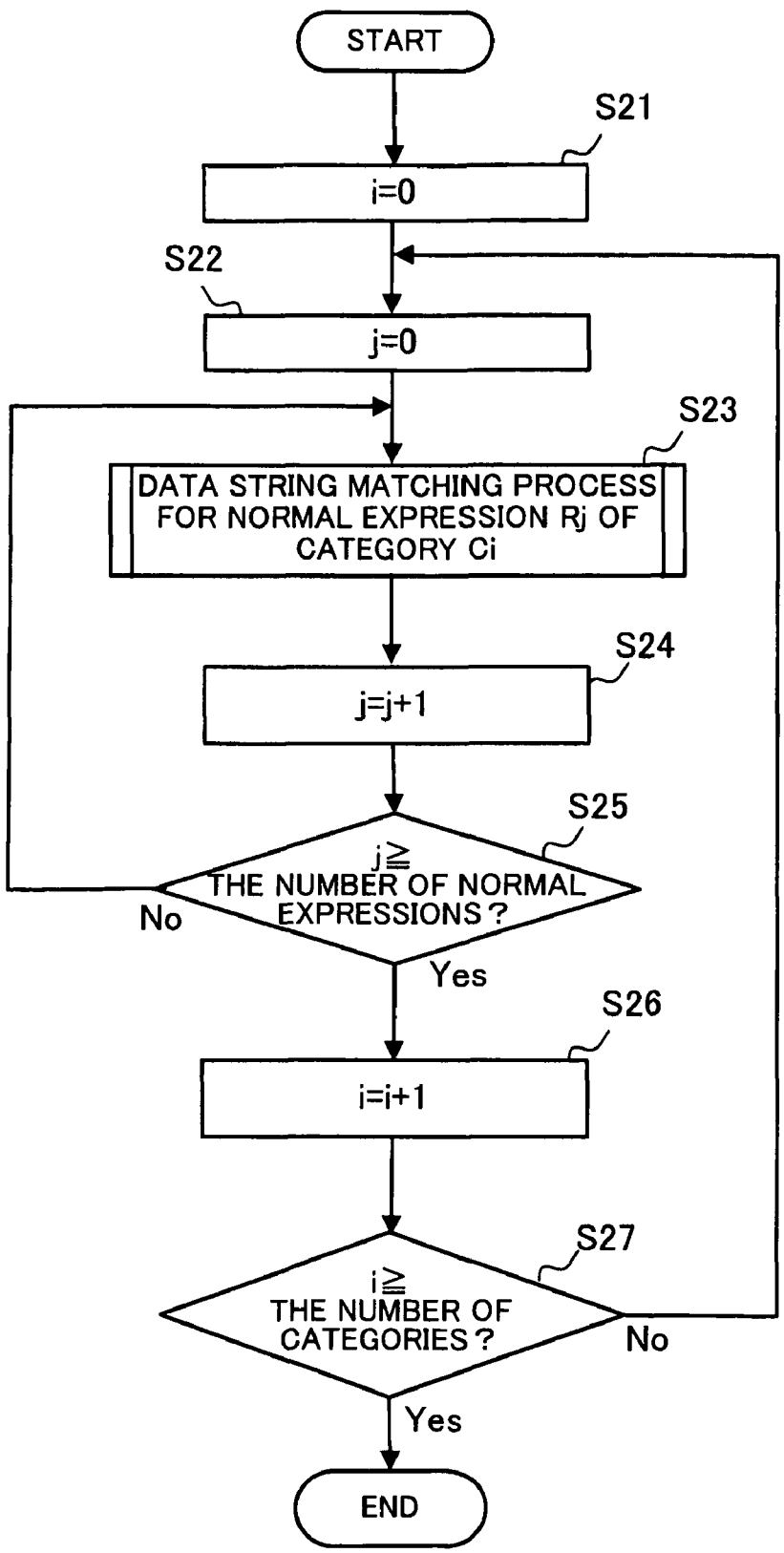
FIG. 16 is a flowchart showing how to perform a data extraction process, according to the embodiment.

Now the data extraction process will be described with reference to a flowchart shown in FIG. 16.

This process is started when a character recognition result is entered.

At step S21, in order to perform the process for all categories defined in logical definitions, i indicating i-th category (Ci) in process is initiated (i=0).

At step S22, in order to perform the process for all item strings defined for category Ci, j indicating j-th normal expression (Rj) in process is initiated (j=0).

At step S23, the data string matching process is performed on the normal expression Rj of category Ci. This process will be described in detail later. By performing the matching process, the maximum clique for the normal expression Rj of category Ci is determined.

At step S24, in order to perform the process for the next normal expression, j is incremented by one.

At step S25, j is compared with the number of normal expressions defined in the logical definitions. If j does not reach the number of normal expressions, the process returns to step S23 to perform the matching process for the next normal expression. If j does, the process for all the normal expressions is completed.

At step S26, in order to perform the process for the next category, i is incremented by one.

At step S27, i is compared with the number of categories defined in the logical definitions. If i does not reach the number of categories, the process returns to step S22 to perform the process for the next category. This process is completed if the process for all the categories is completed.

Figure 17:
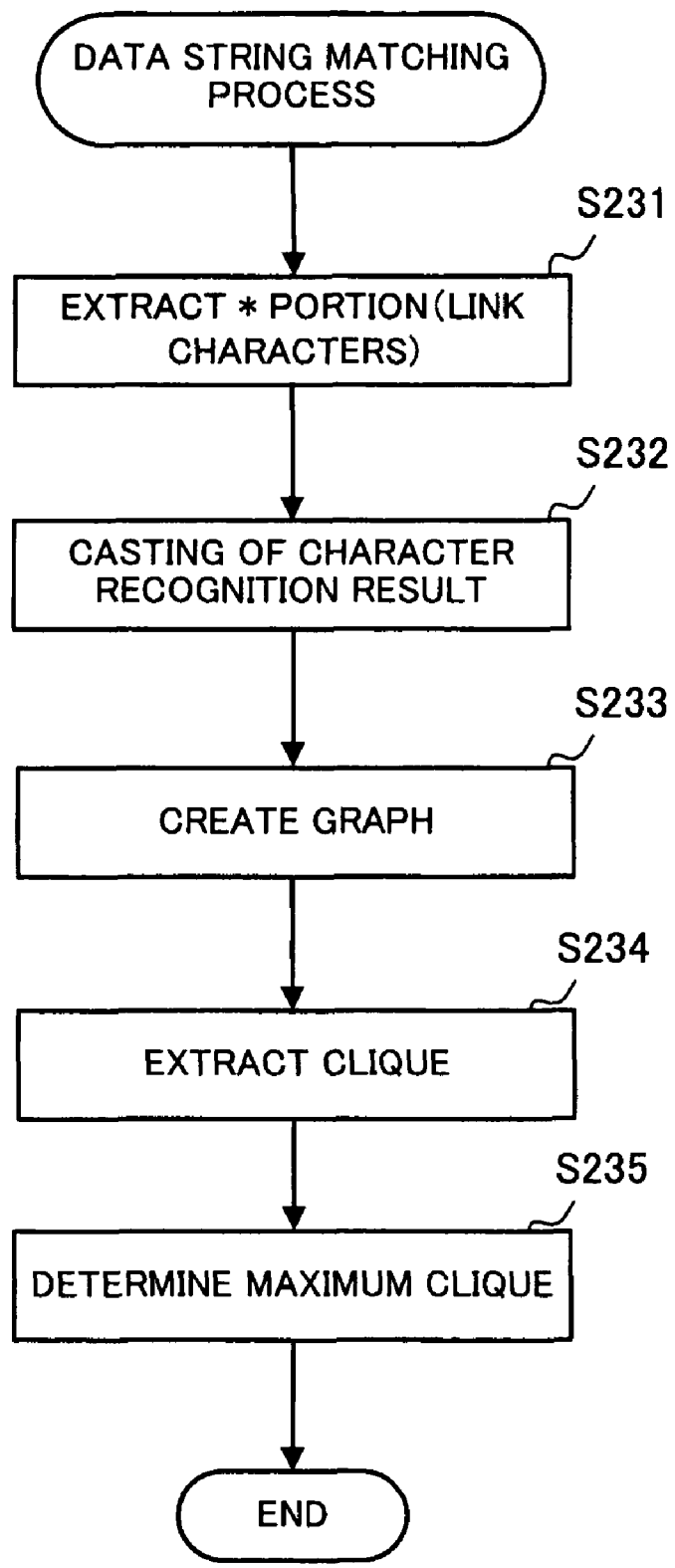
FIG. 17 is a flowchart showing how to perform a data string matching process, according to the embodiment.

Now the data string matching process will be described with reference to a flowchart shown in FIG. 17.

This process is started when a normal expression Rj is specified.

At step S231, a * portion of defined type and other strings which are defined in the data normal expressions stored in the logical definition database 150 are taken out from a character recognition result. Neighboring characters are linked one another, and the collected character group is extracted as a * portion.

At step S232, the characters and a portion represented by * (numerals or the like) in the normal expressions, which are included in the character group extracted as the * portion, are cast.

At step S233, with each of the cast characters and * portion as a node, when two nodes have integrity, the two nodes are connected with a path, so as to thereby create a graph.

At step S234, cliques, which are partial complete graphs of a graph, are extracted from the graph created at step S233. Every node forming a clique is connected to all nodes other than the own node with a path in the clique.

At step S235, out of the cliques extracted at step 234, only cliques which have the number of nodes greater than a prescribed threshold are selected. Further, validity of the cliques in terms of character arrangement is checked, and inappropriate cliques are deleted. With respect to only the remaining cliques having the number of nodes greater than the prescribed threshold, the regions and characters corresponding to the cliques are all output.

By performing the above process, the data string corresponding to the data normal expression Rj of category Ci is extracted.

(3) Item and Data Linking Process

In the item and data linking process, with respect to items extracted by the item extractor 160 and data extracted by the data extractor 170, all possible combinations of them are detected based on the relative position of data with respect to an item defined in the logical definitions, and a combination is determined with taking the entire integrity into consideration. The entire integrity is evaluated by creating a graph and extracting cliques, in the same way as the item extractor 160 and the data extractor 170.

It is assumed that a possible item string I and possible data strings are extracted by the item extractor 160 for category C. The item and data linking 181 sets a surrounding region of the possible item string I based on the relationships (the relative position 205 of data with respect to an item) between an item and data for category C defined in the logical definitions. For example, "below" is defined, the surrounding region is set below the possible item string I. If "right" is defined, the surrounding region is set on the right side of the possible item string I. If there is a possible data string which is within the set surrounding region and satisfies the normal expressions of data for category C, the possible data string and the possible item string are combined. In this connection, if any character other than characters that may exist between an item and data for category C as defined in the logical definitions exists within a circumscribed rectangular including both the possible item string and the possible data string, the possible item string and the possible data string are not combined.

The graph creation (integrity evaluation) 182 creates a graph with each combination of an item string and a data string extracted by the item and data combiner 181 as a node. As to a group of combinations of a possible item string and a possible data string, integrity of all pairs of combinations is checked. Having integrity between two combinations A and B means that possible item strings and possible data strings forming the combinations do not overlap. When two combinations have integrity, nodes corresponding to the two combinations are connected with a path, so as to thereby create a graph.

The combination determination (maximum clique determination) 183 extracts cliques and determines the maximum clique, in the same way as the item string matching process. In the maximum clique extraction, a clique which has the greatest number of nodes is output.

Figure 18:
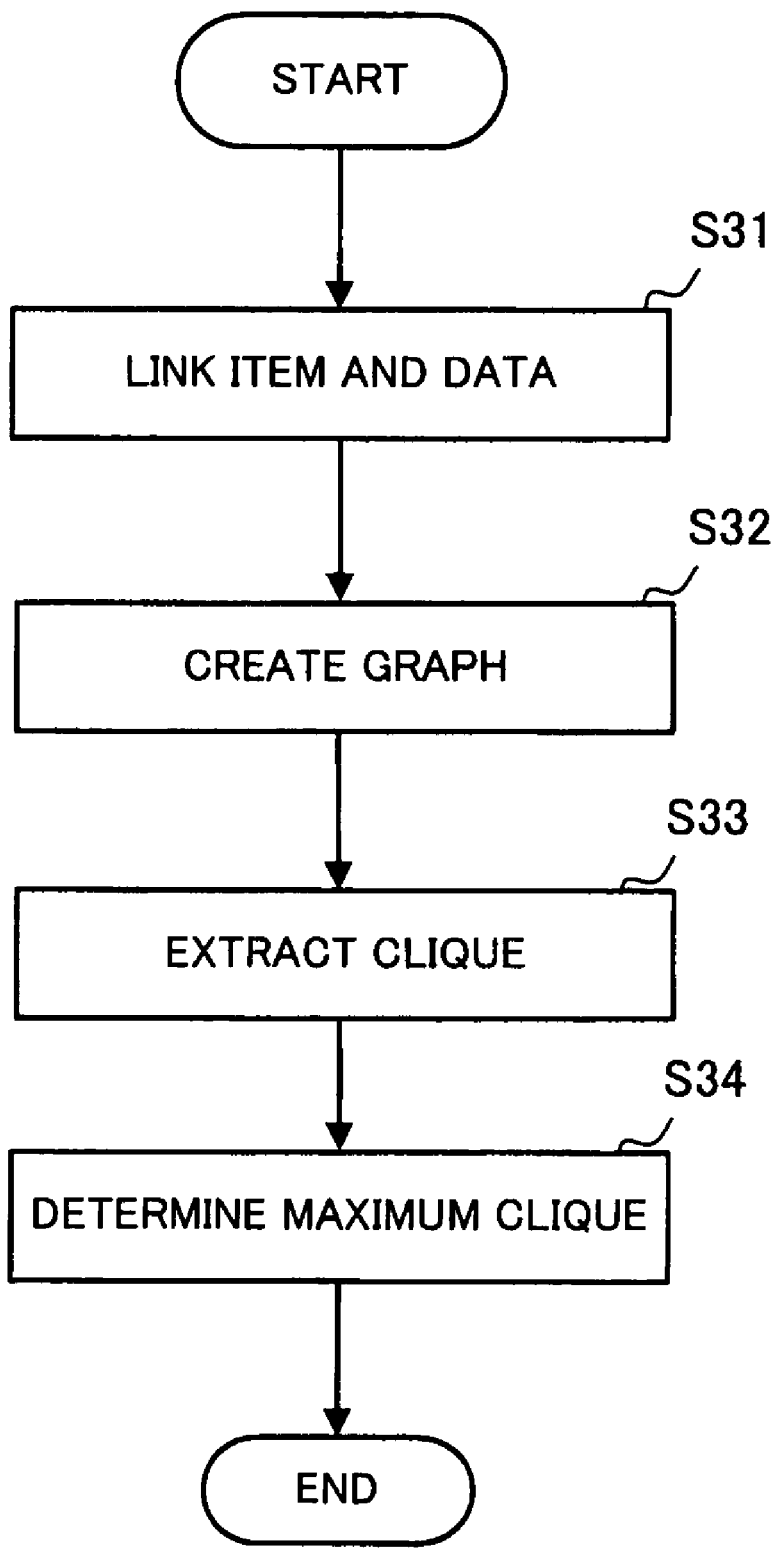
FIG. 18 is a flowchart showing how to perform an item and data linking process, according to the embodiment.
Figure 19A:
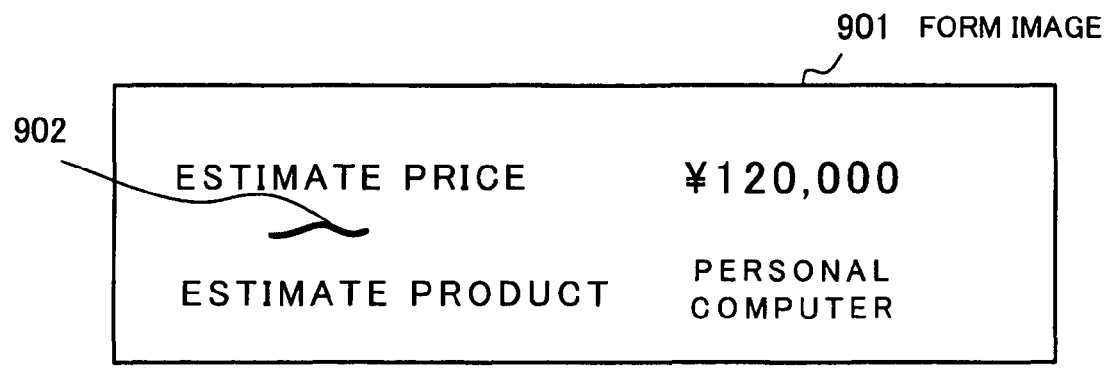
FIGS. 19A and 19B are views showing a case where keywords cannot be correctly extracted due to failure in the layout recognition.
Figure 19B:
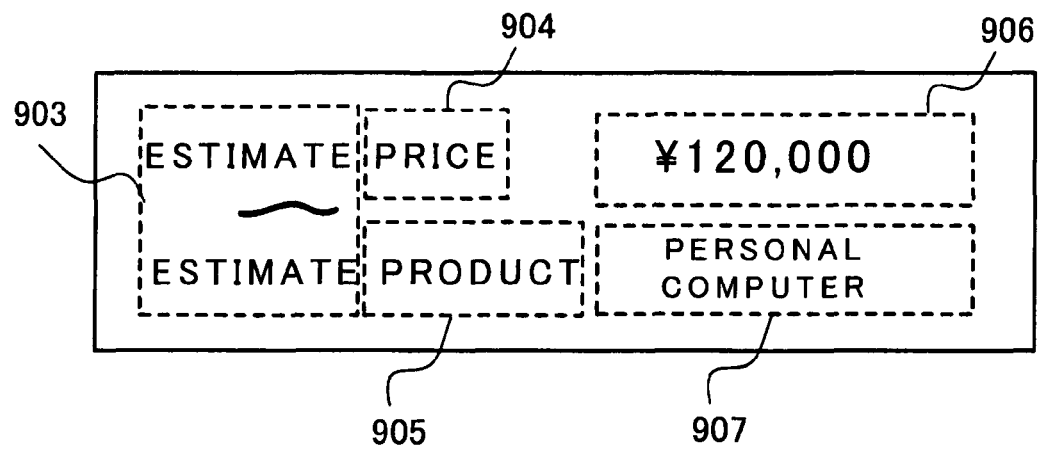

The item and data linking process will be described with reference to a flowchart shown in FIG. 18.

The process is started when an item string and a data string are extracted.

At step S31, a possible item string and a possible data string of a same category are combined according to the relative position of data with respect to an item defined in the logical definitions, and all combinations of a possible item string and a possible data string are detected.

At step S32, with each combination of an item string and a data string extracted at step S31 as a node, integrity between all pairs of combinations is evaluated (it is checked whether the possible item strings and the possible data strings forming the combinations do not overlap), and if integrity is verified, the corresponding nodes are connected with a path, so as to thereby create a graph.

At step S33, cliques, which are partial complete graphs of a graph, are extracted from the graph created at step S32.

At step S34, the maximum clique is extracted from the cliques extracted at step S33. In this connection, a clique having the greatest number of nodes is output as the maximum clique.

By performing the above process, a combination of a possible item string and a possible data string is determined with the entire integrity into consideration. Thereby an appropriate combination can be selected even if there are a plurality of possible combinations.

The processing functions described above can be realized by a computer. In this case, a program is prepared, which describes processes for the functions to be performed by the form processing apparatus. The program is executed by the computer, whereupon the processing functions are accomplished by the computer. The program, which describes the above processing functions, may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include Digital Versatile Discs (DVDs), DVD-Random Access Memory (RAM), Compact Disc Read Only Memory (CD-ROM), CD-Recordable (CD-R)/ReWritable (RW), etc. The magneto-optical recording media include Magneto-Optical disks (MOs) etc.

To distribute the program, portable recording media, such as DVDs and CD-ROMs, on which the program is recorded may be put on sale. Alternatively, the program may be stored in the storage device of the server computer and may be transferred from the server computer to the computer through a network.

The computer which is to execute the program stores in its storage device the server program recorded on a portable recording medium. The computer reads the server program from the storage device and executes a process according to the program. Alternatively, the computer may run the program directly from the portable recording medium to execute the process according to the program. Also, while receiving the program being transferred from the server computer, the computer may sequentially run this program.

The forms processing according to this invention automatically extracts keywords based on form logical definitions defining logical structures that forms have, not based on layout definitions corresponding to the layouts of forms. Therefore, even if forms have different layouts, keywords can be automatically extracted from the forms having the same logical structures. Further, in order to extract keywords, characters which are included in strings defined as keywords are extracted from a character recognition result, combinations of characters each of which satisfies the relationships of a string in the form logical definitions is extracted as possible strings, and possible strings forming keywords are linked. Therefore, even if a string does not completely match a string defined as a keyword, when the string can be judged as having relationships of a string, this is output as a keyword. As a result, stable keyword extraction can be realized, regardless of failure in the layout recognition and the character recognition.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium containing a form processing program for extracting prescribed keywords from a form image scanned, the form processing program causing a computer to perform a procedure comprising:

recognizing a layout of the form image and extracting a readout region containing character images from the form image;

recognizing characters from the character images of the extracted readout region through character recognition, and outputting the recognized characters as a character recognition result;

extracting, from the character recognition result, characters which are included in strings of keywords each including an item and data thereof, the keywords being defined in form logical definitions according to logical structures which are common to forms of a same type;

determining possible strings, including possible item strings for the items and possible data strings for the data of the items, by combining the extracted characters each of which satisfies positional relationships of one of the strings of the keywords; and linking the determined possible item strings and possible data strings according to positional relationships on the form image to determine combinations of the possible strings corresponding to the keywords;

wherein:

the form logical definitions include definitions of item strings representing the items, and when characters included in the item strings are extracted from the character recognition result, the determining casts the extracted characters for corresponding characters of the item strings and extracts as the possible item string a combination of the cast extracted characters which satisfies relationships of one of the item strings.

2. The computer-readable recording medium according to claim 1, wherein every time the extracted characters are obtained from the character recognition result, the determining repeats a process of casting the extracted characters for corresponding characters of the strings of the keywords, detecting, with each of the cast extracted characters as a unit, combinations of cast extracted characters each of which satisfies the positional relationships of the strings, and further, with each of the detected combinations as a unit, detecting combinations of detected combinations each of which satisfies the positional relationships of the strings, until the strings defined as the keywords are extracted.

3. The computer-readable recording medium according to claim 1, wherein the determining combines the extracted characters, based on a graph theory, by placing nodes representing the extracted characters or the determined combinations of extracted characters, connecting with a path each two nodes having integrity in terms of the positional relationships of the strings, and extracting a maximum clique in a graph that is formed from the nodes and paths.

4. The computer-readable recording medium according to claim 1, wherein:

the form logical definitions define data region attributes including data character types and data normal expressions for the data; and when elements of the data normal expressions are detected from the character recognition result, the determining casts the detected elements for corresponding elements of the data normal expressions, and extracts as the possible data string a combination of the cast detected elements which satisfies relationships of one of the data normal expressions.

5. The computer-readable recording medium according to claim 4, wherein:

the data normal expressions are expressed in strings including a wild card which is usable instead of characters of the data character types defined;

the extracting of characters extracts, from the character recognition result, characters of the data character types of the wild card which are defined in the data normal expressions, takes a combination of extracted characters which satisfies the positional relationships of one of the strings as a wild card portion, and extracts from the character recognition result characters which are included in strings defined in the data normal expressions; and the determining determines as the possible data string a combination of the extracted characters and the wild card portion which satisfies positional relationships of the one of the data normal expressions.

6. The computer-readable recording medium according to claim 1, wherein the linking detects all possible combinations of possible item strings and possible data strings, and extracts a greatest number of combinations that do not overlap, from among the detected possible combinations.

7. The computer-readable recording medium according to claim 1, wherein the determining evaluates validity of the extracted characters of each combination in terms of character arrangement, and determines the combinations having verified validity as the possible strings.

8. The computer-readable recording medium according to claim 7, wherein the determining calculates a center point of a region surrounding a character group forming the each combination, calculates a center point of the each combination based on a number of extracted characters included in the each combination, compares the center point of the region surrounding the character group with the center point of the each combination, and evaluates the validity based on a difference between the center points compared.

9. The computer-readable recording medium according to claim 7, wherein the determining judges that a character group forming a combination is inappropriate as a possible string if there is another character between two characters of the character group corresponding to two characters which are next to each other in the form logical definitions.

10. The computer-readable recording medium according to claim 1, wherein the recognizing of characters recognizes only character types which possibly appear in the form image, based on the form logical definitions through the character recognition.

11. The computer-readable recording medium according to claim 1, wherein the procedure further comprises:
updating, after the possible strings are extracted, the character recognition result by re-recognizing only characters which are included in the strings of the keywords corresponding to the determined possible strings in the form logical definitions; and
extracting, from the updated character recognition result, possible strings by combining the re-recognized characters each of which satisfies the relationships of one of the strings of the keywords.

12. The computer-readable recording medium according to claim 1, wherein, with a first combination arranged on a line as a first string and with a second combination arranged on a different line from the first string as a second string, the determining extracts a combination of the first string and the second string which satisfies relationships of the strings defined in the form logical definitions, as a possible string arranged on plural lines, each of the first and second combinations satisfying the positional relationships of the strings.

13. The computer-readable recording medium according to claim 12, wherein, as to the first string and the second string, the determining determines whether a first region surrounding the first string and a second region surrounding the second string satisfy such a condition that their horizontal coordinates at least partially overlap and their vertical coordinates do not overlap, and if the condition is not satisfied, determines that the first string and the second string are not a combination which satisfies the relationships of the strings defined in the form logical definitions.

14. A form processing apparatus for extracting prescribed keywords from a form image scanned, the apparatus comprising:
a layout recognizer which recognizes a layout of the form image and extracts a readout region containing character images from the form image;
a character recognizer which recognizes characters from the character images of the extracted readout region through character recognition, and outputs the recognized characters as a character recognition result;
a form logical definition memory to store form logical definitions defining keywords, each including an item and data thereof, according to logical structures which are common to forms of a same type;
a possible string extractor which reads out the form logical definitions regarding a form to be processed, extracts from the character recognition result characters which are included in strings of the keywords defined in the form logical definitions, and determines possible strings, including possible item strings for the items and possible data strings for the data of the items, by combining the extracted characters each of which satisfies positional relationships of one of the strings of the keywords; and
a linking unit which links the determined possible item strings and possible data strings according to positional relationships on the form image to determine combinations of the possible strings corresponding to the keywords;
wherein:
the form logical definitions include definitions of item strings representing the items, and
when characters included in the item strings are extracted from the character recognition result, the possible string extractor casts the extracted characters for corresponding characters of the item strings and extracts as the possible item string a combination of the cast extracted characters which satisfies relationships of one of the item strings.

15. A form processing method for extracting prescribed keywords from a form image scanned, the method comprising:
recognizing a layout of the form image and extracting a readout region containing character images from the form image;
recognizing characters from the character images of the extracted readout region through character recognition, and outputting the recognized characters as a character recognition result;
extracting, from the character recognition result, characters which are included in strings of keywords each including an item and data thereof, the keywords being defined in form logical definitions according to logical structures which are common to forms of a same type;
determining possible strings, including possible item strings for the items and possible data strings for the data of the items, by combining the extracted characters each of which satisfies positional relationships of one of the strings of the keywords; and
linking the determined possible item strings and possible data strings according to positional relationships on the form image to determine combinations of the possible strings corresponding to the keywords;
wherein:
the form logical definitions include definitions of item strings representing the items, and
when characters included in the item strings are extracted from the character recognition result, the determining casts the extracted characters for corresponding characters of the item strings and extracts as the possible item string a combination of the cast extracted characters which satisfies relationships of one of the item strings.

* * * * *